United States Patent [19]
Ohtsubo et al.

[11] Patent Number: 5,170,249
[45] Date of Patent: Dec. 8, 1992

[54] DIGITAL SIGNAL PROCESSING APPARATUS HAVING DEVICES FOR DELAYING AND COMBINING COLOR SIGNALS

[75] Inventors: Hiroyasu Ohtsubo; Yukinobu Tada, both of Yokohama; Masaru Noda, Kanagawa; Michio Masuda, Yokohama, all of Japan

[73] Assignee: Hitachi, Ltd., Tokyo, Japan

[21] Appl. No.: 510,867

[22] Filed: Apr. 18, 1990

[30] Foreign Application Priority Data

Apr. 21, 1989 [JP] Japan ................... 1-100008

[51] Int. Cl.⁵ .................................. H04N 9/07
[52] U.S. Cl. ........................ 358/41; 358/44
[58] Field of Search ............ 358/41, 43, 44, 37

[56] References Cited

U.S. PATENT DOCUMENTS

| 4,205,336 | 5/1980 | Nagumo ................... 358/43 |
| 4,827,331 | 5/1989 | Nakamura et al. ............. 358/41 |
| 4,903,121 | 2/1990 | Uomori et al. ............... 358/41 |
| 4,974,066 | 11/1990 | Tusji ..................... 358/44 |
| 5,034,805 | 7/1991 | Ishizaka ................... 358/44 |

FOREIGN PATENT DOCUMENTS

| 58-103283 | 6/1983 | Japan .................... 358/41 |
| 1-32792 | 2/1989 | Japan . |

Primary Examiner—Edward L. Coles, Sr.
Assistant Examiner—Kim Yen Vu
Attorney, Agent, or Firm—Antonelli, Terry, Stout & Kraus

[57] ABSTRACT

In a digital signal processor for an imaging system, a first pixel signal including first and second color information items and a second pixel signal including third and fourth color information items are alternately outputted to generate an image signal, which is subdivided into a portion to be delayed by a horizontal scanning period and a portion not to be delayed such that these signals are thereafter combined to form an image signal having respective pixel signals so as to achieve a matrix processing on the resultant signal to attain red, blue, and green signals.

7 Claims, 19 Drawing Sheets

| Mg | G | Mg | G | Mg | G | Mg |
|----|---|----|---|----|---|----|
| Ye | Cy | Ye | Cy | Ye | Cy | Ye |
| Mg | G | Mg | G | Mg | G | Mg |
| Cy | Ye | Cy | Ye | Cy | Ye | Cy |
| Mg | G | Mg | G | Mg | G | Mg |

DIGITAL SIGNAL PROCESSING APPARATUS HAVING DEVICES FOR DELAYING AND COMBINING COLOR SIGNALS

BACKGROUND OF THE INVENTION

The present invention relates to a digital signal processor suitable for a color video camera using a charge-coupled device (CCD) achieving simultaneous scanning of two lines of mixed or interlaced pixels.

An example of a digital signal processing in a video camera related to the present invention has been described in the JP-A-63-45153.

In the video cameras, solid-state imaging devices are arranged in various kinds of configurations primarily classified into a metal-oxide semiconductor (MOS) type and a CCD type. In general, an MOS-type sensor has plural output lines, whereas a CCD-type sensor possesses a single output line. For digitalization of signal processing, the CCD-type sensor of the single output line requires only one analog-to-digital (A/D) converter and is hence advantageously used as compared with the MOS-type sensor necessitating many A/D converters. Furthermore, the CCD-type sensors are configured in various methods. At present, there has been commonly employed a CCD sensor which operates in a mixed or interlaced pixel read method and which has been described in pages 1 to 6 of the Technical Report of the Institute of Television Engineers of Japan, TEBS101-1, ED836. This CCD image sensor is different in the constitution from the CCD image sensor described in the JP-A-63-45153. However, for the CCD sensor, the signal processing can be digitalized by adopting the similar processing.

In a video camera using the CCD image sensor operating in the mixed pixel read method, color difference signals respectively associated with R-Y and B-Y signals are originally generated for each horizontal scanning. Either one of the color signals which is not produced is interpolated with a color difference signal produced in the horizontal scanning period (i.e. before the 1H period), thereby obtaining the R-Y and B-Y signals for the current line undergoing a horizontal scanning. In this description, letters R, B, and Y stand for a pixel signal of red, a pixel signal of blue, and a luminance or brightness signal, respectively. Due to the processing above, the following problems arise with respect to the picture quality.

1) The line interpolation leads to different sampling points of color difference signals and hence the vertical resolution is lowered.

2) The signal processing inherent to a camera in which the red (R), green (G), and blue (B) signals undergo a $\gamma$ processing to produce color difference signals from resultant signals is not conducted. Consequently, the fidelity of color reproduction is deteriorated even when the quality of hue is not taken into consideration. Furthermore, the color matrix has a reduced degree of freedom and hence a color moiré is likely to increase.

The video camera using the digital signal processing described in the JP-A-63-45153 also comprises the same fundamental constitution associated with the signal processing and hence has the similar problem.

SUMMARY OF THE INVENTION

It is therefore an object of the present invention to provide a digital signal processing circuit for use in a video camera employing a CCD sensor of the mixed or interlaced pixel read type for simultaneously producing two kinds of color difference signals from pixel information obtained by horizontally scanning adjacent two or three lines, thereby improving the picture quality and rationalizing the signal production.

In order to achieve the object above, a signal processing circuit in accordance with the present invention comprises A/D convert means in which a signal produced from a CCD sensor undergone a correlational double sampling (CDS) processing to enhance reduction of a noise of the signal and an auto gain control (AGC) to limit the quantity of the signal to a fixed amount is converted from an analog signal into a digital signal for each pixel signal thereof, 1H delay means for delaying by one horizontal scanning period (1H) a first digital signal supplied from said A/D convert means, first compute means for separating pixel signals from the first digital signal and a second digital signal produced from said 1H delay means and for conducting a matrix processing on the separated pixel signals, thereby creating red (R), green (G), and blue (B) signals, enhance or enhancement means for receiving as inputs thereto the first and second digital signals to generate a luminance (Y) signal undergone an edge enhancement at least in a vertical direction, a $\gamma$ process means for accomplishing a $\gamma$ processing on each of the R, G, B, and Y signals, second compute means for producing color difference signals R-Y and B-Y from the R, G, and B signals resultant from the $\gamma$ processing, and standard television signal generate means for generating a standard television signal from the R-Y and B-Y signals and the luminance signal undergone the $\gamma$ processing.

The CCD sensor achieving the mixed pixel reading includes a filter arrangement of magenta (Mg), cyan (Cy), yellow (Ye), and green (G) as shown in FIG. 2. When reading electric charges developed through a photoelectric transformation or conversion, the system processes two lines for each read operation. For example, as shown in FIG. 2, in fields A and B, the electric charges are read out in an order of $A_n$ and $A_{n+1}$ and $B_n$ and $B_{n+1}$, respectively. (The fields A and B are of the different combinations of the filter elements to achieve an interlaced scanning.) As a result, for each horizontal scanning, the sensor produces pixel signals of a combination of Mg+Ye and G+Cy and a combination of Mg+Cy and G+Ye. For each signal combination, the pixel signals are alternately developed as shown in FIG. 3.

In consequence, based on the first digital signal and the second digital signal obtained by delaying the first digital signal by 1H, four kind of pixel signals Mg+Ye, G+Cy, Mg+Cy, and G+Ye are produced in association with the respective colors. The first compute means achieves a matrix processing on these signals to create the red, green, and blue signals R, G, and B. In this connection, a description will be given of the principle of the matrix processing. Assuming here the relationships Mg=R+B, Ye=R+G, and Cy=G+B to be established, the following expressions result.

$$Mg + Ye = (R + B) + (R + G) = 2R + G + B \quad (1)$$

$$G + Cy = G + (G + B) = 2G + B \quad (2)$$

$$Mg + Cy = (R + B) + (G + B) = R + G + 2B \quad (3)$$

-continued
$$G + Ye = G + (R + G) = R + 2G \quad (4)$$

This leads to expression (5) as follows.

$$\begin{bmatrix} Mg + Ye \\ G + Cy \\ Mg + Cy \\ G + Ye \end{bmatrix} = \begin{bmatrix} 2 & 1 & 1 \\ 0 & 2 & 1 \\ 1 & 1 & 2 \\ 1 & 2 & 0 \end{bmatrix} \begin{bmatrix} R \\ G \\ B \end{bmatrix} \quad (5)$$

Let us assume relationships to be held as follows.

$$\begin{bmatrix} Mg + Ye \\ G + Cy \\ Mg + Cy \\ G + Ye \end{bmatrix} = D \begin{bmatrix} 2 & 1 & 1 \\ 0 & 2 & 1 \\ 1 & 1 & 2 \\ 1 & 2 & 0 \end{bmatrix} = Q \begin{bmatrix} R \\ G \\ B \end{bmatrix} = X$$

The expression above is reduced to be $$D = QX \quad (6)$$

Representing the matrix including R, G, and B as follows.

$$X = Q'D \quad (7)$$

When expression (7) is assigned to expression (6), expression (8) is attained as follows:

$$D = Q(Q'D) = (QQ')D \quad (8)$$

where, $Q'$ is a matrix satisfying $QQ' = I$ (I denotes a unitary matrix). Although the matrix $Q'$ has a degree of freedom and hence a plurality of solutions, the system actually determines a solution to minimize the color moire,é. The value of Q above is associated with an example of designing. In an actual case, the elements of the matrix Q are determined as optimal design values depending on associated pixel signals as follows $$Q = \begin{bmatrix} a_{11} & a_{12} & \cdots & a_{1m} \\ \vdots & & & \vdots \\ \vdots & & & \vdots \\ a_{n1} & \cdots & \cdots & a_{nm} \end{bmatrix}$$

where, $\underline{n}$ and $\underline{m}$ are positive integers. The first compute means conducts a matrix computation of the expression (7) by use of the matrix $Q'$. In the conventional method, the optimization above of the matrix including R, G, and B has been difficult. In contrast thereto, according to the method of the present invention, the color moiré can be further reduced.

The signals R, G, and B thus attained are fed to the $\gamma$ process means to undergo a $\gamma$ processing. The respective signals resultant from the $\gamma$ processing are supplied to the second compute means. In accordance with the NTSC, for example, a color difference matrix processing is carried out on the signals as follows.

$$R - Y = 0.7R - 0.59G - 0.11B$$

$$B - Y = 0.89B - 0.59G - 0.3R$$

to produce the color difference signals R-Y and B-Y. In this operation, unlike the conventional example above, without achieving the signal interpolation, two color difference signals are simultaneously generated each time the horizontal scanning is conducted on the adjacent two lines. Furthermore, the operation to create the two color difference signals is a color signal processing inherent to an operation of a camera and hence develops a more satisfactory fidelity in the color reproduction.

As a result, in accordance with the present method, the problems of the prior art such as those of the vertical resolution of colors, the fidelity of color reproduction, and the color moiré are removed.

In addition, the enhancer circuit produces a difference signal between the first digital signal undergone the A/D conversion and the second digital signal delayed by 1H. The difference signal is then subjected to a base clipping operation and a high-frequency noise reduction. The resultant signal is added to the first or second digital signal to conduct a vertical edge emphasis. Namely, owing to the above configuration in which the 1H delay mean is commonly used in the color separator circuit and the enhancer, the response in the vertical direction is also improved without additionally disposing a 1H delay means.

In a case where the processing above is carried out through an analog processing, the 1H delay circuit is to be constituted with a CCD delay line of a synchronous type. This configuration however is attended with problems as follows.

1) Variations take place in the gain.
2) The linearity of the circuit is deteriorated.
3) A color mixture occurs between two kinds of pixel signals of the dot-sequential system. As a result, the produced color signal is attended with a line pair for each horizontal scanning. In contrast to this method, the present method employs the digitalized processing constitution and hence 1) the variations in the gain, 2) the nonlinearity, 3) and the color mixture can be prevented, thereby advantageously avoiding the occurrence of the line pair.

Moreover, since considerable portions of the signal processing have been digitalized, the following excellent advantages are attained.

1) The filter conventionally constituted with a large-sized CCD can be replaced with a digital filter, which may be manufactured in an integrated circuit (IC).
2) The adjustment to absorb the variations in the gain is unnecessitated.
3) Various adjustments can be electronically achieved in an automatic manner.
4) By integrally manufacturing the A/D and D/A converters, the system can be integrated in a one-chip IC.
5) Deterioration of the signal-to-noise (S/N) ratio can be prevented by fully considering the S/N ratio deterioration associated with the truncation error in the computation.

In addition, the 1H delay memory can be loaded with an arbitrary delay stage count and hence can be adopted in any CCD sensors having different numbers of the horizontal pixels.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
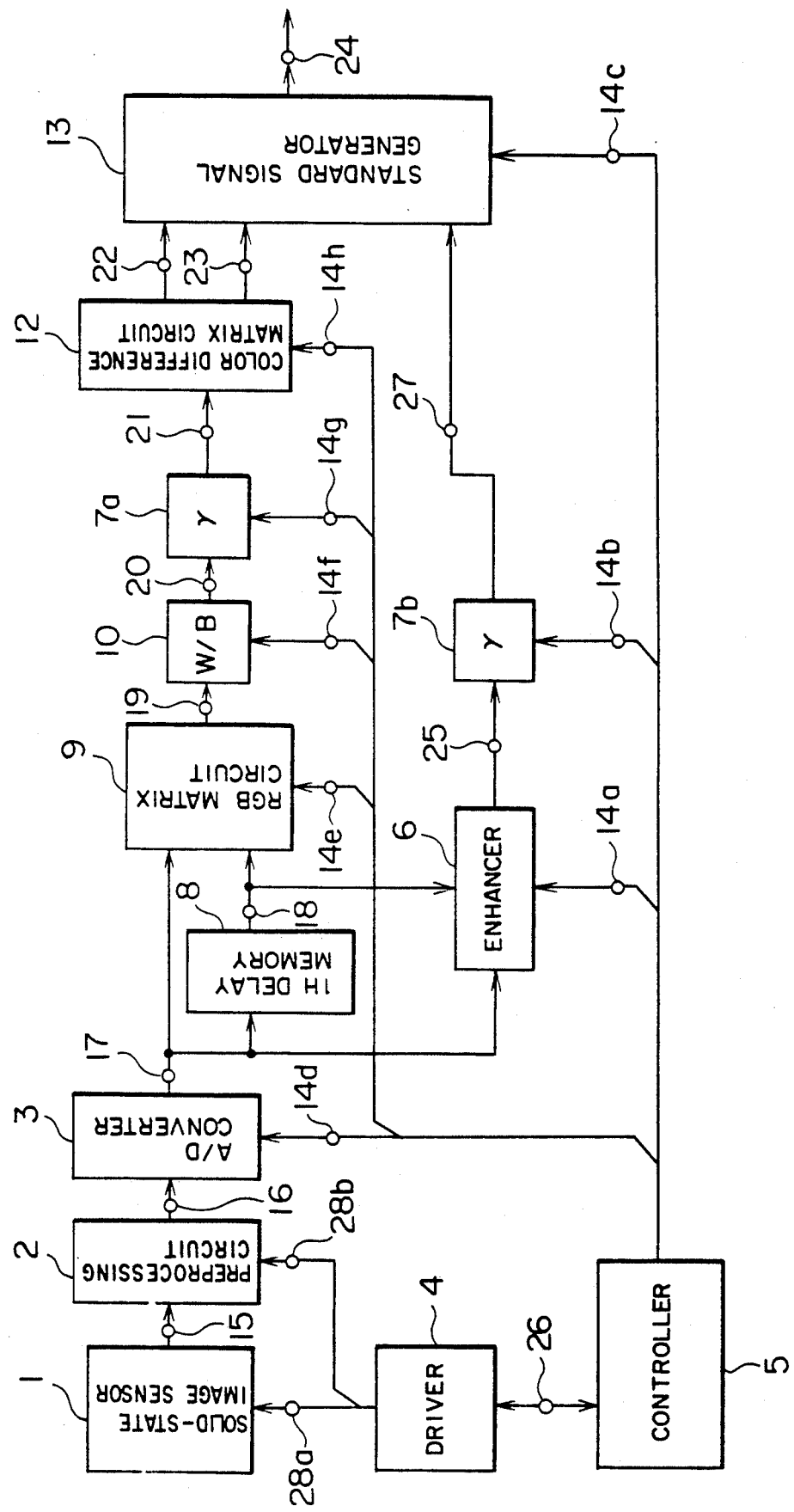
FIG. 1 is a schematic block diagram showing a first embodiment of a digital signal processor system in accordance with the present invention.

Referring now to the drawings, a description will be given of an embodiment according to the present invention.

FIG. 1 is a configuration block diagram of a first embodiment in accordance with the present invention. This system includes a solid-state imaging device or image sensor 1, a pre-processing circuit 2, an analog-to-digital (A/D) converter circuit 3, a driver circuit 4, a control circuit 5, an enhancer circuit 6, γ processing circuits 7a and 7b, a 1H delay memory 8, a matrix circuit for red, green and blue signals 9, a white balance circuit 10, a color difference matrix circuit 12, a standard television signal generator circuit 13, and terminals 14a to 14h, 15 to 27, 28a, and 28b.

Figures 2, 3:
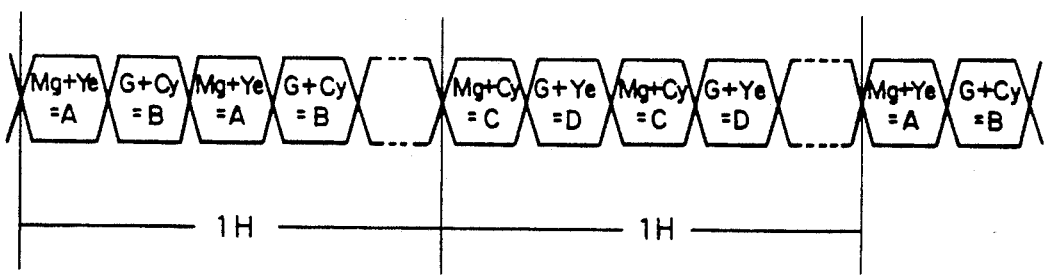
FIG. 2 is a diagram schematically showing a filter arrangement in a solid-state imaging device.
FIG. 3 is a diagram illustratively showing digital dot-sequence signals.

The driver circuit 4 supplies at a timing synchronized with the control circuit 5 a drive pulse and a control pulse for the CDS processing to the solid-state imaging device 1 and the preprocessing circuit 2, respectively. Based on the received drive pulse, the imaging device 1 conducts a photoelectric conversion to convert an image focused on an imaging plane by use of a lens, not shown, from a light signal into an electric signal. The signal from the image sensor 1 is supplied to the preprocessing circuit 2 to undergo the CDS processing for an improvement of a noise reduction and the AGC processing for a constant signal level. The resultant signal is fed to the A/D converter 3, which is responsive to an A/D conversion clock delivered from the control circuit 5 to achieve an A/D conversion on the pixel signal received from the preprocessing circuit 2. The pixel signal is converted in a dot-sequential manner for each pixel. Namely, each dot is processed for each pixel in a sequential fashion. The attained digital signal is outputted to the RGB matrix circuit 9, the 1H delay memory 8, and the enhancer circuit 6. The digital signal varies in a constitution thereof for each horizontal scanning. That is, the signal in a horizontal scanning includes pixel signals of two colors (to be denoted as A and B), whereas the signal in a subsequent horizontal scanning comprises pixel signals of other two colors (to be designated as C and D). The respective two-color pixel signals are dot-sequentially obtained in an alternate manner. (These signals are to be referred to as dot-sequential signals herebelow.) In a sensor having a filter arrangement of FIG. 2, for example, the four kinds of pixel signals A to D above are attained as Mg+Ye, G+Cy, Mg+Cy, and G+Ye, respectively. Resultantly, the A/D converter circuit 3 produces as outputs therefrom the dot-sequential signals of FIG. 3. The 1H delay memory 8 delays the received dot-sequential signal by 1H to deliver the delayed signal to the RGB matrix circuit 9. Based on the dot-sequential signal from the A/D converter circuit 3 and the dot-sequential signal thus delayed by 1H in the 1H delay memory 8, the RGB matrix circuit 9 separates the pixel signals A to D associated with four colors to conduct a matrix processing on the attained pixel signals A to D, thereby creating red, green, and blue signals R, G, and B for each horizontal scanning. The RGB matrix circuit 9 sends the generated signals R, G, and B to the white balance circuit 10. Namely, a white balance operation is achieved to adjust gains of the red and blue signals R and B with respect to the green signal G. These signals thus undergone the white balance operation are sent to the γ processing circuit 7a, which carries out a γ processing on the received signals to deliver the obtained signals to the color difference matrix circuit 12. This circuit 12 achieves a matrix processing on the red, green, and blue signals undergone the γ processing to create color difference signals R-Y and B-Y for each horizontal scanning to pass the obtained signals to the standard signal generator circuit 13. The color difference signal processing has been thus completed to generate the color difference signals.

Next, the luminance signal processing will be described.

A luminance signal is obtained as a sum of the pixel signal combination A and B and the combination C and D. The enhancer circuit 6 first achieves a band limitation (to remove a frequency component of fs/2, where fs is a pixel read frequency) on the dot-sequential signals respectively received from the A/D converter circuit and the 1H delay memory 8 to generate a luminance signal before a 1H delay and a luminance signal after a 1H delay. Subsequently, the enhancer circuit 6 produces a difference signal between these luminance signals to attain a high-frequency component in the vertical direction. The circuit 6 adds the obtained signal to the luminance signal before or after the 1H delay to enhance the high-frequency component of the luminance signal in the vertical direction. The enhancer 6 further conducts an enhancement on resultant luminance signal to emphasize the high-frequency component thereof in the horizontal direction. This resultantly compensates for deterioration of a modulation transfer factor (MTF) of the luminance signal due to a modulation transfer factor of a lens or the like. The luminance signal undergone the enhancement is fed to the γ processing circuit 7b, which in turn conducts a γprocessing on the received luminance signal to send the resultant signal to the standard signal generator circuit 13.

The standard signal generator circuit 13 processes the color difference signals R-Y and B-Y received from the color difference matrix circuit 12 to create in accordance with a control signal fed from the control circuit 5 a standard television signal of the NTSC, for example. In this situation, the signal is directly sent to an apparatus having a digital interface. If the apparatus has an analog interface, the signal is converted from a digital form into an analog form to be supplied to the apparatus.

Figure 4:
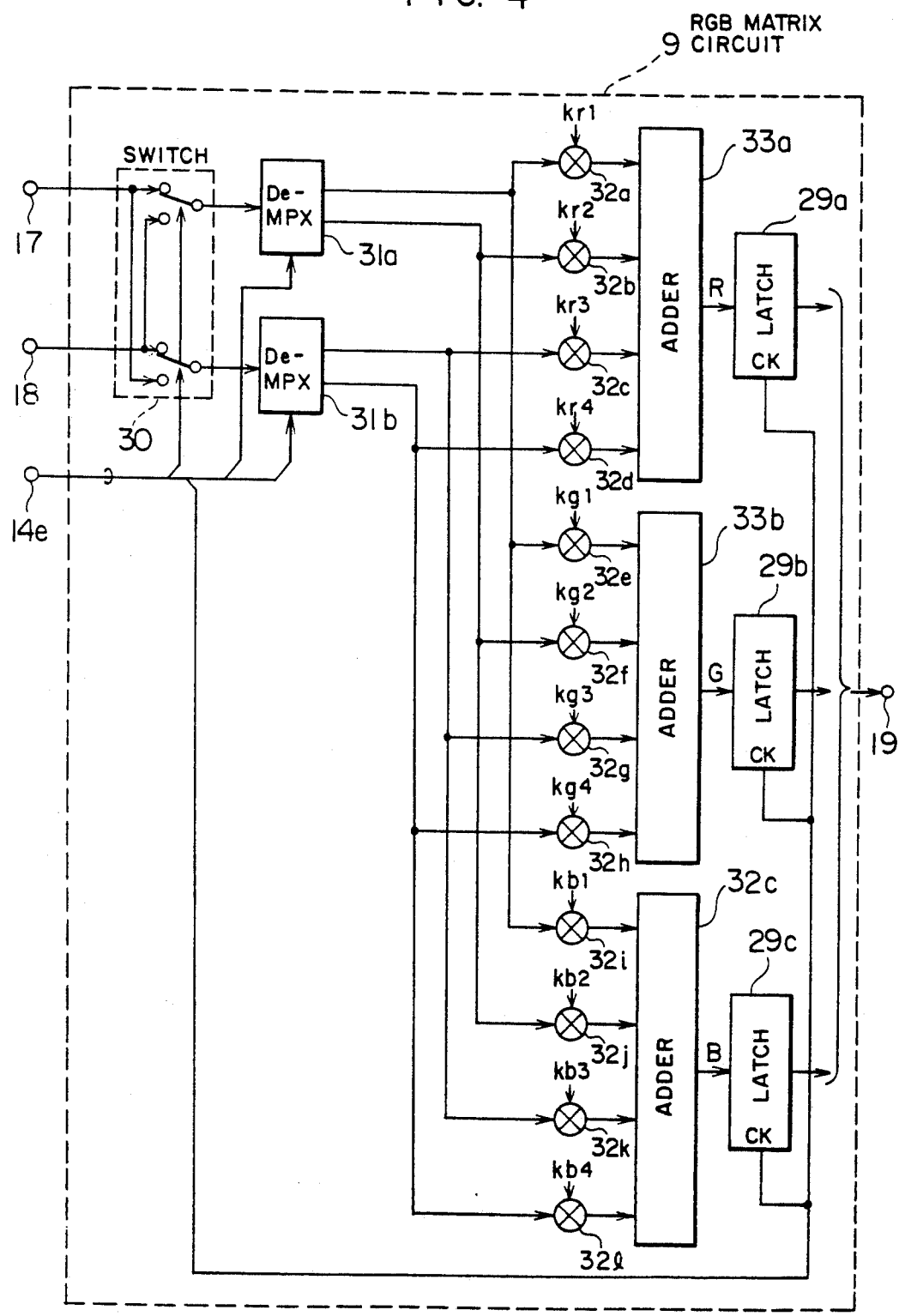
FIG. 4 is a diagram schematically showing an embodiment of a matrix circuit for red, green, and blue signals.
Figure 5A:
FIGS. 5A to 5I are schematic diagrams showing waveforms of signals in respective sections of FIG. 4.
Figure 5B:
Figure 5C:
Figure 5D:
Figure 5E:
Figure 5F:

FIGS. 4, 5A to 5I, 6 to 12, and 13A to 13G are diagrams and graphs showing in detail respective blocks of the first embodiment and signals thereof. A description will next be given of these blocks by referring to the drawings FIG. 4 shows an example of the RGB matrix circuit 9. FIGS. 5A to 5I are graphs of signal waveforms in respective sections of the circuit 9. The configuration of FIG. 4 includes a switch 30, demultiplexers (De-MPXs) 31a and 31b, coefficient multiplying circuits 32a to 32e, adder circuits 33a to 33c, and latch circuits 29a to 29c. Via the terminals 17 and 18, the dot-sequential signal undergone the A/D conversion and the dot-sequential signal obtained by delaying the signal above by 1H are fed respectively from the A/D converter 3 and the 1H delay memory 8 to the switch 30. The dot sequential signal varies in the constitution for each horizontal scanning as described above. In a horizontal scanning, as shown in FIG. 5A, the signal includes pixel signals Ai and Bi; whereas in the next horizontal scanning, as shown in FIG. 5B, the signal comprises pixel signals Ci and Di. The subscript i denotes that the signal is a pixel signal for each horizontal scanning and takes values 1, 2, 3, ... n-1, n, n+1, etc. In consequence, at a horizontal scanning, when a signal of FIG. 5A is supplied to the terminal 17, a signal of FIG. 5B preceding the signal of FIG. 5B by 1H is fed to the terminal 18. In the subsequent scanning, the signals of FIGS. 5B and 5A are supplied to the terminals 17 and 18, respectively. The switch 30 is responsive to a pulse having half a horizontal frequency supplied from the control circuit 5 via the terminal 14e to achieve a change-over operation of the dot-sequential signals to be sent to the demultiplexers 31a and 31b. Namely, the demultiplexers 31a and 31b are supplied with the signals of FIGS. 5A and 5B in a continuous fashion. The demultiplexer 31a separates from the dot-sequential signal fed from the switch 30 two pixel signals Ai and Bi to create signals of FIGS. 5C and 5D. Similarly, the demultiplexer 31b separates pixel signals Ci and Di from the dot-sequential signal to produce signals shown in FIGS. 5E and 5F. The pixel signals Ai, Bi, Ci, and Di from the demultiplexers 31a and 31b are sent, as shown in FIG. 4, to the coefficient multiplier circuits 32a to 32e. The pixel signals are respectively multiplied by coefficients $k_{r1}$ to $k_{r4}$, $k_{g1}$ to $k_{g4}$, $k_{b1}$ to $k_{b4}$. The resultant signals are supplied to the adder circuits 33a to 33c, respectively. The adder circuits 33a to 33c add the received signals in a respective fashion to feed the obtained signals to the latch circuits 29a to 29c, respectively. In this connection, the operations conducted in the coefficient multiplier circuits and the adder circuits are summarized as follows.

$$\begin{bmatrix} k_{r1} & k_{r2} & k_{r3} & k_{r4} \\ k_{g1} & k_{g2} & k_{g3} & k_{g4} \\ k_{b1} & k_{b2} & k_{b3} & k_{b4} \end{bmatrix} \cdot \begin{bmatrix} A_i \\ B_i \\ C_i \\ D_i \end{bmatrix} \quad (9)$$

Designating the left-hand matrix as P', which corresponds to Q' in the preceding description, $$\begin{bmatrix} k_{r1} & k_{r2} & k_{r3} & k_{r4} \\ k_{g1} & k_{g2} & k_{g3} & k_{g4} \\ k_{b1} & k_{b2} & k_{b3} & k_{b4} \end{bmatrix} = P'$$

the relationship is reduced to $$\begin{bmatrix} R_i \\ G_i \\ B_i \end{bmatrix} = P' \begin{bmatrix} A_i \\ B_i \\ C_i \\ D_i \end{bmatrix} \quad (10)$$

Figure 5G:
Figure 5H:
Figure 5I:

This expression (10) is an RGB matrix operation to attain values of Ri, Gi, and Bi. The latch circuits 29a to 29c respectively latch therein the supplied signals Ri, Gi, and Bi to deliver the latched signals as shown in FIGS. 5G, 5H, and 5I, respectively.

Figure 6:
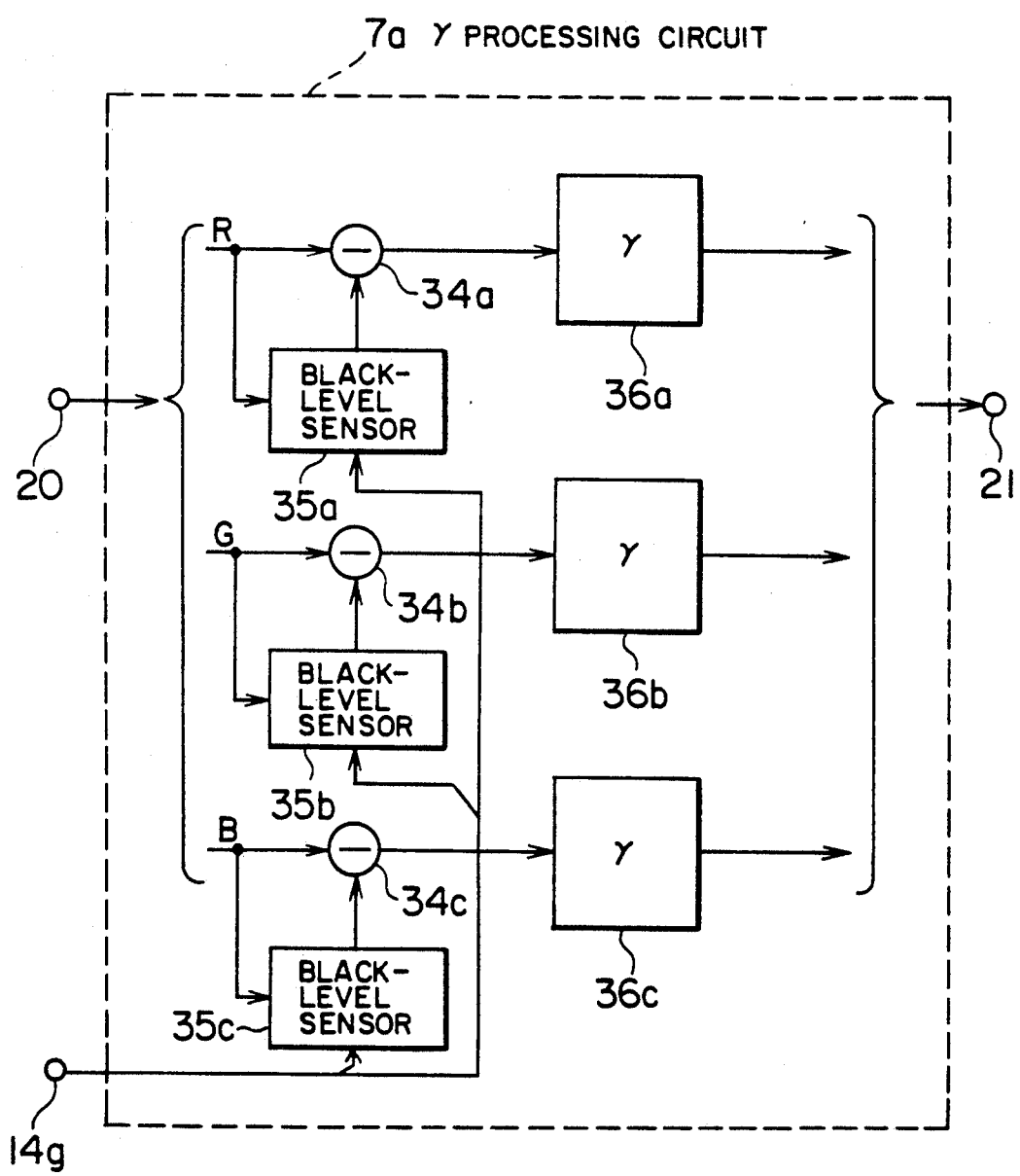
FIG. 6 is a diagram illustratively showing an embodiment of a γ processing circuit.

Referring next to FIG. 6, an example of the γprocessing circuit 7a will be described. The configuration includes subtraction circuits 34a to 34c, black level sensor circuits 35a to 35c, and γ processing circuits 36a to 36c. The signals Ri, Gi, and Bi undergone the gain adjustment are fed from the white balance circuit 10 to the subtraction circuits 34a to 34c and the black level sensor circuit 35a to 35c, respectively. The black level sensors 35a to 35c respectively sense a black level on the received signals Ri, Gi, and Bi, thereby sending the sensed values to the subtraction circuits 34a to 34c, respectively. Several methods of sensing the black level have been available. Generally, a portion of a horizontal or vertical blanking (BLK) portion of a light receiving surface of the sensor is blocked not to receive a light, thereby disposing an optical black portion. Each of the signals Ri, Gi, and Bi in a period associated with the black portion is integrated to sense the black level. In this method, the black level sensor circuits 35a to 35c are responsive to a pulse supplied from the terminal 14g to indicate an optical black level period so as to compute an average of signals obtained in the optical black level period to sense the black level. The subtraction circuits 34a to 34c respectively subtracts the black level sense value from the black level sensors 35a to 35c from the supplied signals Ri, Gi, and Bi, thereby setting the black level after the γ processing to a fixed value; 0, for example. This processing is called a black level reproduction. The signals Ri, Gi, and Bi undergone the black level reproduction are respectively fed to the γ processing circuits 36a to 36c to be subjected to γ processing represented as follows.

$$R_i' = (R_i)^{1/\gamma} \qquad (11)$$

$$G_i' = (G_i)^{1/\gamma} \qquad (12)$$

$$B_i' = (B_i)^{1/\gamma} \qquad (13)$$

Figure 7:
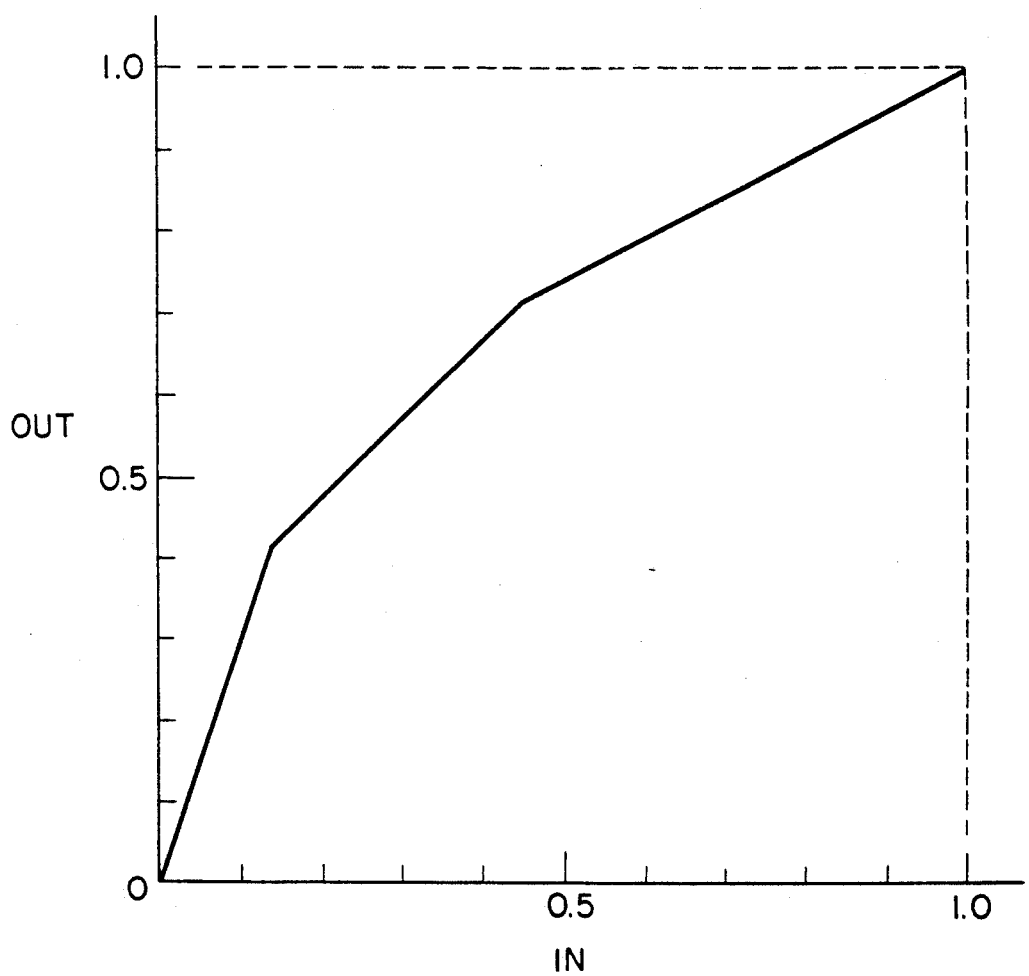
FIG. 7 is a graph showing an input/output characteristic of the γ processing circuit.

Where, γ is 2.2 in the NTSC system and is 2.8 in the PAL and SECAM systems. Actually, however, the γ processing is conducted, because of a restriction on a size of the circuit and the like, by use of an approximation. For example, a broken line characteristic as shown in FIG. 7 is employed.

Figure 8:
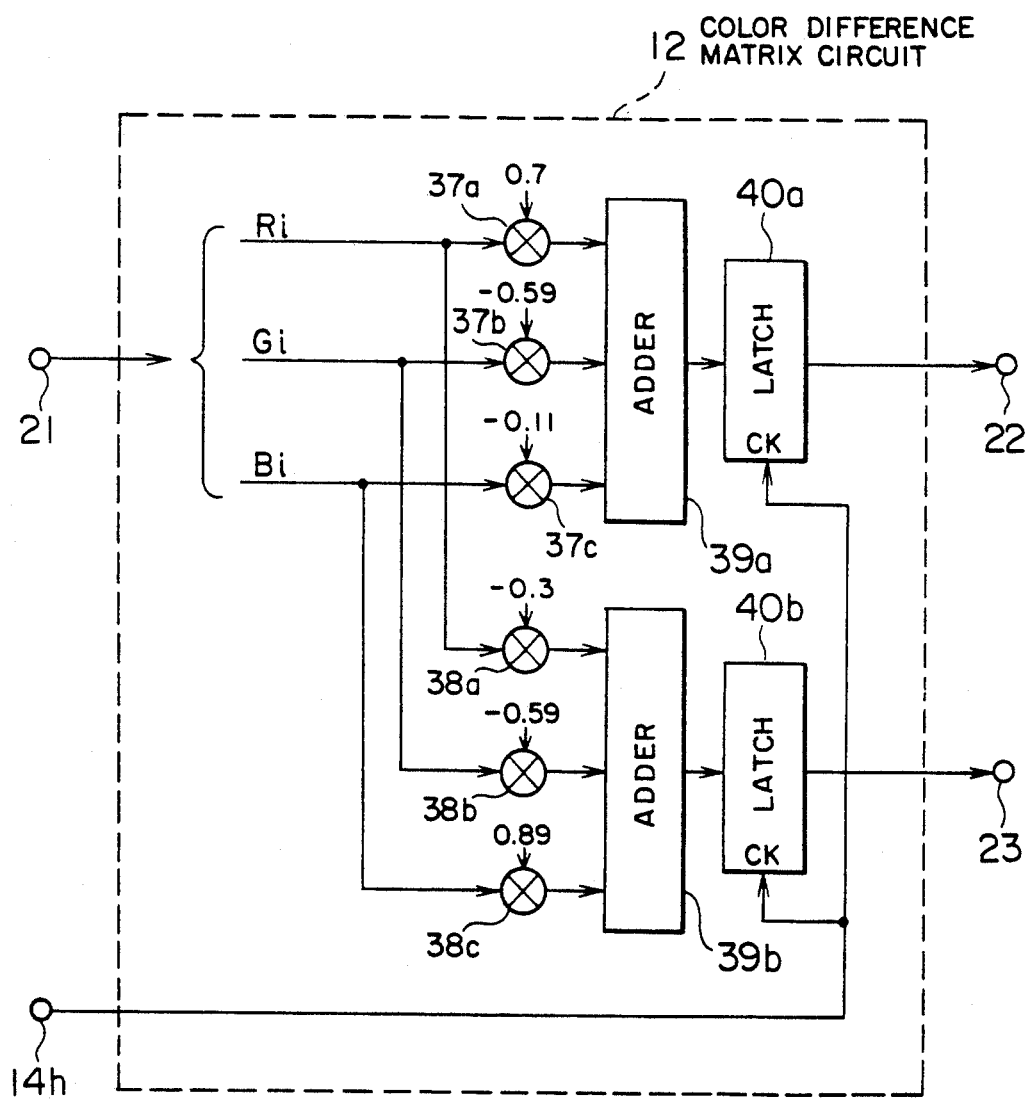
FIG. 8 is a diagram showing an embodiment of a color difference matrix circuit.

FIG. 8 is a block diagram showing an example of the color difference matrix circuit 12. This system includes coefficient multiplier circuits 37a to 37c and 38a to 38c, adder circuits 39a and 39b, and latch circuits 40a and 40b. The configuration operates as follows. The signals Ri, Gi, and Bi undergone the γprocessing in the γ processing circuit 7a are respectively supplied to the multiplies 37a, 37b, and 37c and to 38a, 38b, and 38c. The received signals are resultantly multiplied therethrough by 0.7, −0.59, −0.11 and −0.3, −0.59, and −0.89, respectively. The signals resultant from the computations above are fed to the adder circuits 39a and 39b as shown in FIG. 8. The adders conduct the following computations to attain the color difference signals R-Y and B-Y.

$$(R-Y) = 0.7R_i' - 0.59G_i' - 0.11B_i' \qquad (14)$$

$$(B-Y) = 0.89B_i' - 0.59G_i' - 0.3R_i' \qquad (15)$$

The resultant color difference signals R-Y and B-Y are delivered to the latch circuits 40a and 40b. The latches are responsive to a latch clock from the control circuit 5 via the terminal 14h to latch the supplied signals, thereby delivering the latched signals to the terminals 22 and 23, respectively.

Figure 9:
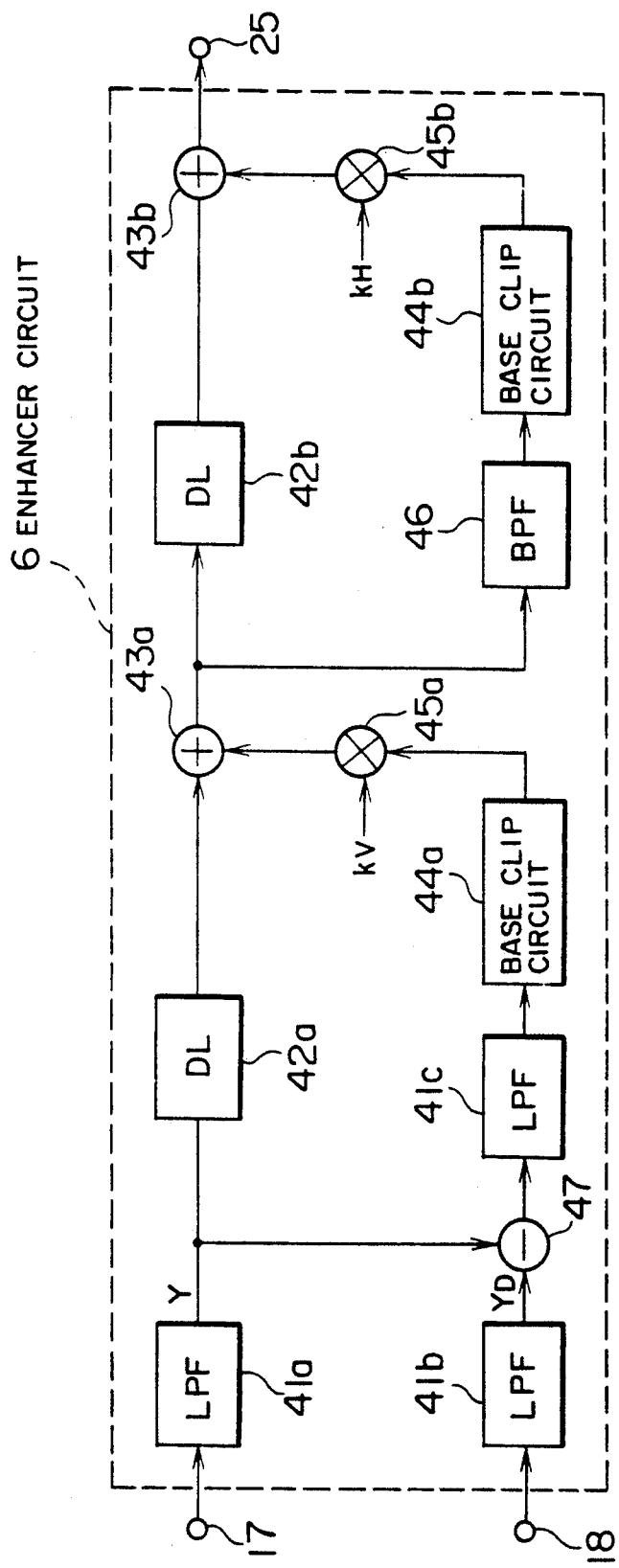
FIG. 9 is a diagram illustratively showing an embodiment of an enhancer circuit.

FIG. 9 is a block diagram showing an example of the enhancer circuit 6 including low-pass filters (LPFs) 41a, 41b, and 41c; delay circuits 42a and 42b, adder circuits 43a and 43b, base clip circuits 44a and 44b, coefficients multiplier circuits 45a and 45b, a band-pass filter (BPF) 46, and a subtraction circuit 47. Next, the operation of the enhancer circuit 6 will be described. First, the LPFs 41a and 41b respectively receive the dot-sequential signal from the A/D converter circuit 3 and the dot-sequential signal delayed by 1H from the 1H delay memory 8. In each of the dot sequential signals, two pixel signals (A and B or C and D) appear in a repreatious manner. The LPFs 41a and 41b remove the components associated with the repetition period to obtain a luminance signal Y and a luminance signal $Y_D$ delayed by 1H. On receiving the luminance signals, the subtraction circuit 47 subtracts the 1H-delayed luminance signal $Y_D$ from the luminance signal Y to supply a resultant difference signal Y-YD to the LPF 41c. The LPF 41c removes from the received difference signal a high-frequency component including a high-frequency noise to deliver the resultant signal to the base clip circuit 44a.

Figure 10:
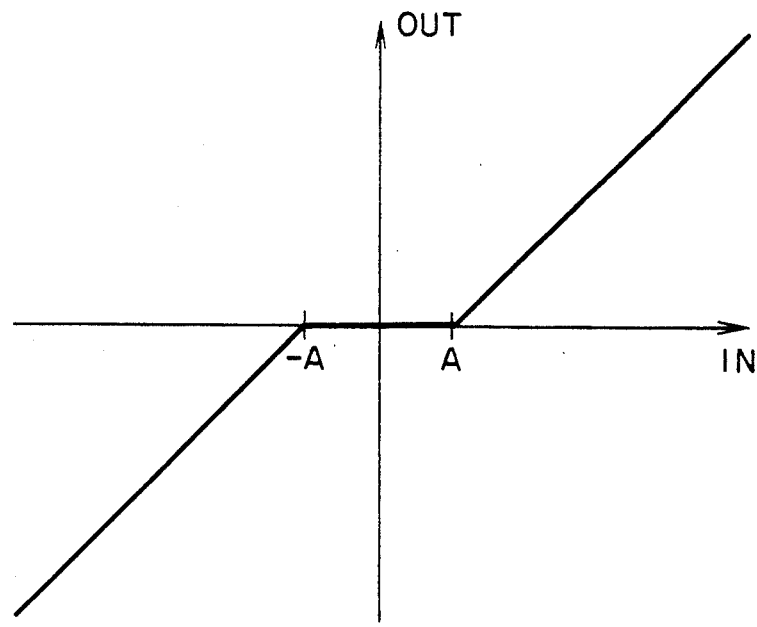
FIG. 10 is a graph showing an input/output characteristic of the base clip circuit.

The base clip circuit 44a having an input/output characteristic of FIG. 10 regards as a noise a signal component having an absolute signal value A or less to remove the component from the received signal, thereby developing a vertical enhance signal. The vertical enhance signal is not required to possess a critical frequency characteristic. In the LPF 41c, a cut-off frequency is set to about one megahertz to about two megahertz. Furthermore, the coefficient multiplier circuit 45a multiplies the vertical enhance signal by $k_V$ to deliver the resultant signal to the adder 43a. On the other hand, the delay circuit 42a delays the luminance signal Y by a total delay time associated with the subtraction circuit 47, the LPF 41c, the base clip circuit 44a, and the coefficient multiplier circuit 45a, thereby equalizing the delay time to that of the vertical enhance signal fed to the adder 43a. The adder circuit 43a adds the vertical enhance signal to the luminance signal Y to produce a luminance signal undergone the vertical enhancement. The obtained signal is fed to the delay circuit 42b and the BPF 46. The BPF 46, the base clip circuit 44b, the coefficient multiplier circuit 45b, the delay circuit 42b, and the adder circuit 43b constitute an enhancer of a horizontal direction. On receiving the luminance signal, the BPF 46 extracts therefrom a component of frequencies in a frequency band to be enhanced, thereby delivering the extracted frequency component to the base clip circuit 44b. Like the base clip circuit 44a, the base clip circuit 44b removes from the received signal a small-amplitude component as a noise to produce a horizontal enhance signal. When the signal includes a small quantity of noises, the base clip processing need not be necessarily achieved and hence may possibly be omitted. The horizontal enhance signal is fed to the coefficient multiplier 45b to be multiplied by $k_H$. The resultant signal is supplied to the adder 43b. On the other hand, the delay circuit 42b delays, like the delay circuit 42a, the received luminance signal by a total delay time related to the BPF 46, the base clip circuit 44b, and the coefficient multiplier circuit 45b. The delayed luminance signal is delivered to the adder 43b, which in turn adds the horizontal enhance signal to the luminance signal. Through the operation of the embodiment above, a luminance signal enhanced in the vertical and horizontal directions is produced. In the enhancement, however, the base clip circuits 44a and 44b cannot remove the noise in a low-intensity of illumination with a low signal-to-noise (S/N) ratio. This results in a deteriorated S/N ratio, which may lead to a lower picture quality in some cases. In order to reduce such a chance, the coefficient multiplier circuits 45a and 45b adopt the coefficients $k_H$ and $k_V$, which are set to be smaller in the lower intensity of illumination to correct the magnitude of enhancement. For example, when the AGC operates in association with an AGC voltage, the values of the coefficients $k_H$ and $k_V$ are reduced.

Figure 11:
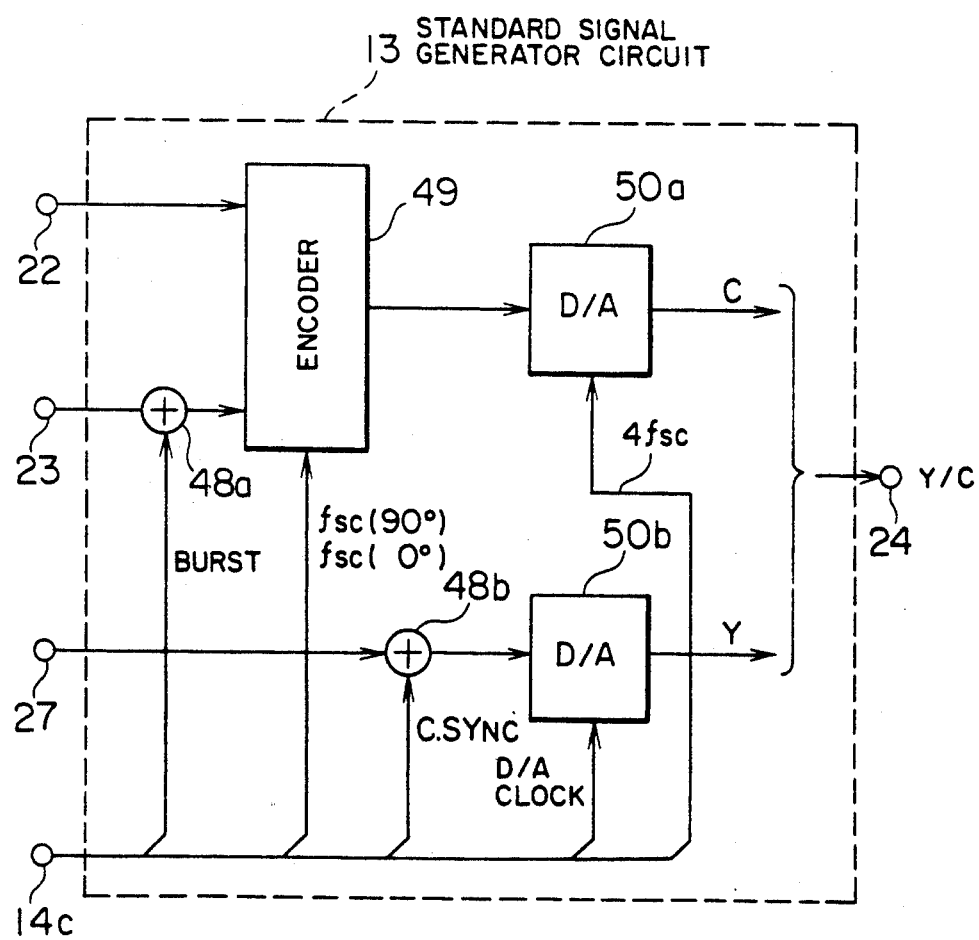
FIG. 11 is a diagram showing an embodiment of a standard signal generator circuit.

FIG. 11 is a block diagram showing an embodiment of the standard signal generator circuit 13 comprising adder circuits 48a and 48b, an encoder circuit 49, and digital-to-analog (D/A) converter circuits 50a and 50b.

In the signals of the standard television systems such as the NTSC, PAL, and SAECAM, a color signal is generally modulated to be multiplexed with a luminance signal. The method of modulating the color signal varies between the television systems. Namely, in the NTSC and PAL, the color difference signals R-Y and B-Y undergo an orthogonal balanced modulation by use of a color subcarrier fsc; whereas, in the SECAM, the color signals are frequency-modulated for each line in a sequential fashion. Of these modulations, the orthogonal balanced modulation employed in the NTSC and PAL systems is more easily digitalized. The digitalized operation of the orthogonal balanced modulation is similar to an analog operation thereof. That is, the color difference signals R-Y and B-Y are subjected to balanced modulations by respectively using two pulse signals having a frequency fsc and having a phase difference 90° therebetween such that the modulated signals are thereafter added to each other. Furthermore, an orthogonal balanced modulation circuit of the digital system can also be easily configured as follows. Namely, the circuit need only includes a polarity inverter circuit which produces signals of positive and negative polarities when the pulses above are "H"and "L", respectively. FIG. 11 shows an embodiment of the standard signal generator circuit 13 in the NTSC and PAL systems. The operation of this circuit will next be described.

The color difference signals R-Y and B-Y are fed from the color matrix circuit 12 respectively via the terminal 22 and 23 to the encoder 49 and the adder circuit 48a, respectively. The adder 48a adds the received signal B-Y to a burst signal supplied from the control circuit 5 via the terminal 14c to send the resultant signal to the encoder 49. The encoder circuit 49 is responsive to a subcarrier pulse received from the control circuit 5 to achieve a digital operation of the orthogonal balanced modulation on the color difference signals R-Y and B-Y to supply the obtained signal to the D/A converter 50a. The converter 50a converts the received signal into analog color signal C undergone the modulation. On the other hand, the luminance signal is fed via the terminal 27 to the adder circuit 48b. The adder 48b adds the luminance signal to a composite synchronization signal (C.SYNC) from the controller 5 to deliver the resultant signal to the D/A converter circuit 50b. The D/A converter 50b converts the digital luminance signal into an analog luminance signal Y.

The primary constituent blocks of the first embodiment have been briefly described. Although the white balance circuit 10 and the γ processing circuit 7b have not been described in detail, the white balance circuit 10 would be simply constructed by use of a digital multiplier circuit which changes gains of the signals R and B and the γ processing circuit 7b could be configured in a completely similar fashion as for the γprocessing circuit 7a associated with the color signal.

Figure 12:
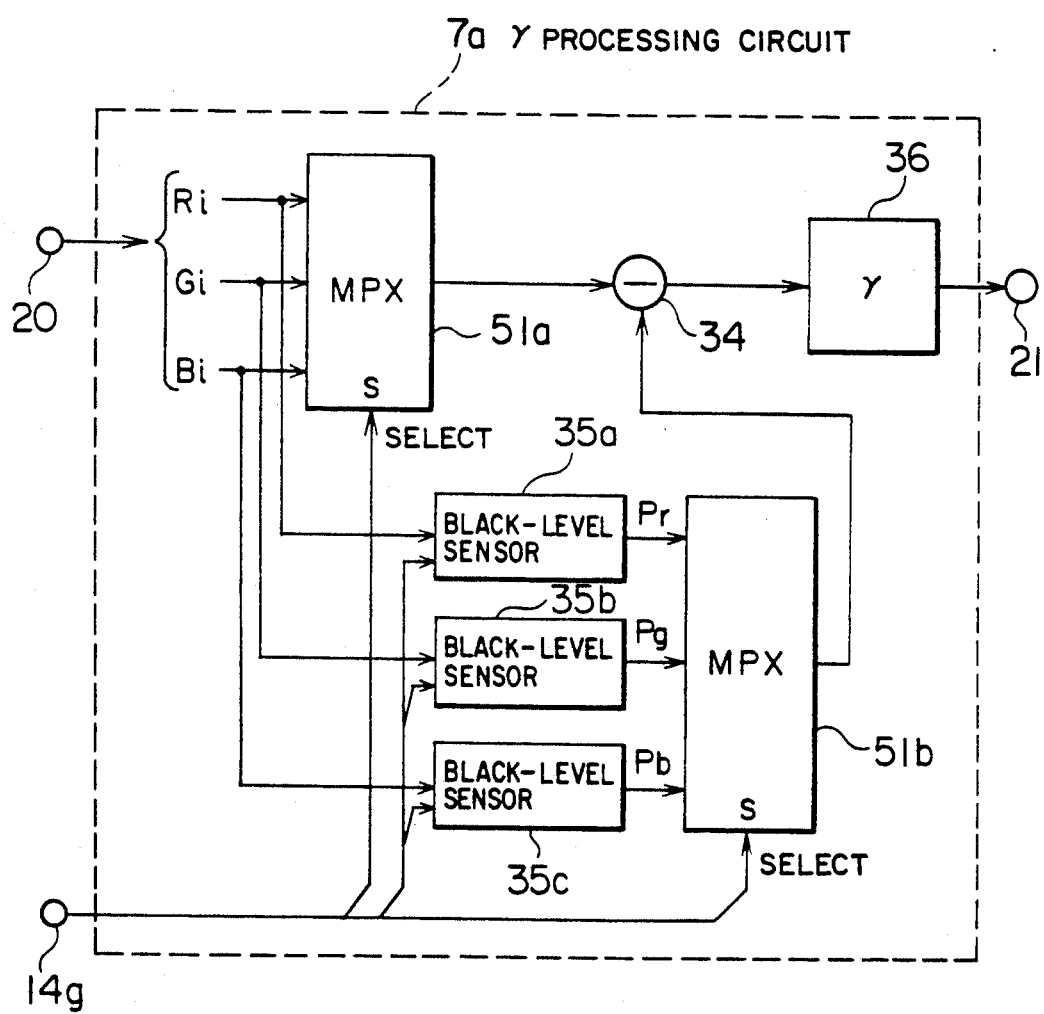
FIG. 12 is a diagram illustratively showing an alternative embodiment of a γ processing circuit.
Figure 13A:
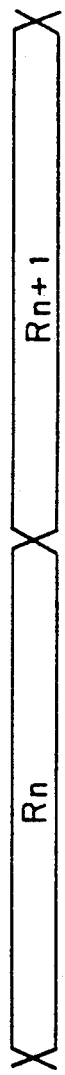
FIGS. 13A to 13G are schematic diagrams showing waveforms of signals in respective sections of FIG. 12.
Figure 13B:
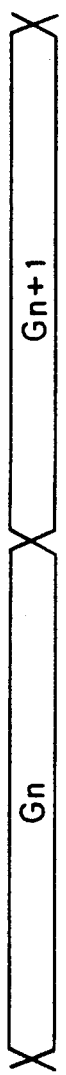
Figure 13C:
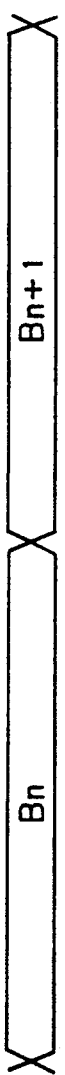
Figure 13D:
Figure 13E:
Figure 13F:
Figure 13G:
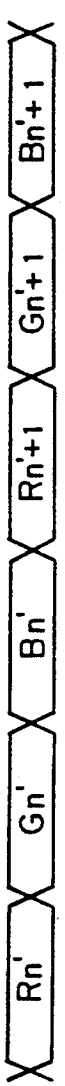

FIG. 12 is a block diagram showing an alternative embodiment of the γ processing circuit 7a above. FIGS. 13A to 13G are waveforms developed in respective sections of the circuit 7a. The configuration of FIG. 12 comprises black level sensor circuits 35a, 35b, and 35c, which are identical to those of FIG. 6; a subtraction circuit 34, a γ processing circuit 36 identical to that of FIG. 6, and multiplexers (MPXs) 51a 51b. The signals Ri, Gi, and Bi from the terminal 20 are each fed to the MPX 51a and the black level sensors 35a to 35c. The black level sensor circuits 35a to 35c respectively sense, like in the case of the preceding embodiment, black levels of the color signals Ri, Gi, and Bi to send black-level sense values $k_r$, $k_g$, and $k_b$ to the MPX 51b. The MPXs 51a and 51b are responsive to a select signal from the controller to respectively multiplex the color signals Ri, Gi, and Bi of FIGS. 13A to 13C and the sense Values $k_r$, $k_g$, and $k_b$ in a dot sequential manner as shown in FIGS. 13D and 13E. The multiplexed color signals and black level sense values are supplied to the subtraction circuit 34. This circuit 34 subtracts the multiplexed black levels from the multiplexed color signals to create a multiplexed color signal in which the black levels are reproduced as shown in FIG. 13F. The obtained color signal with the reproduced black level is fed to the γprocessing circuit 36 to undergo a γ processing in the similar fashion as described above, thereby generating a signal of FIG. 13G.

In accordance with this example, only a small-sized MPX circuit has been additionally employed. When compared with the conventional system including three channels of the subtraction circuits and γ processing circuits of FIG. 6, each being of a large circuit size, the present configuration necessitates only one channel of the subtraction circuit and the γ processing circuit. Resultantly, the increase in the circuit size can be considerably minimized.

The description above has been given of an example in which the circuit size of the γ processing is reduced. In accordance with the similar method, the reduction of the circuit size can also be achieved in the other color signal processing blocks.

Figure 14:
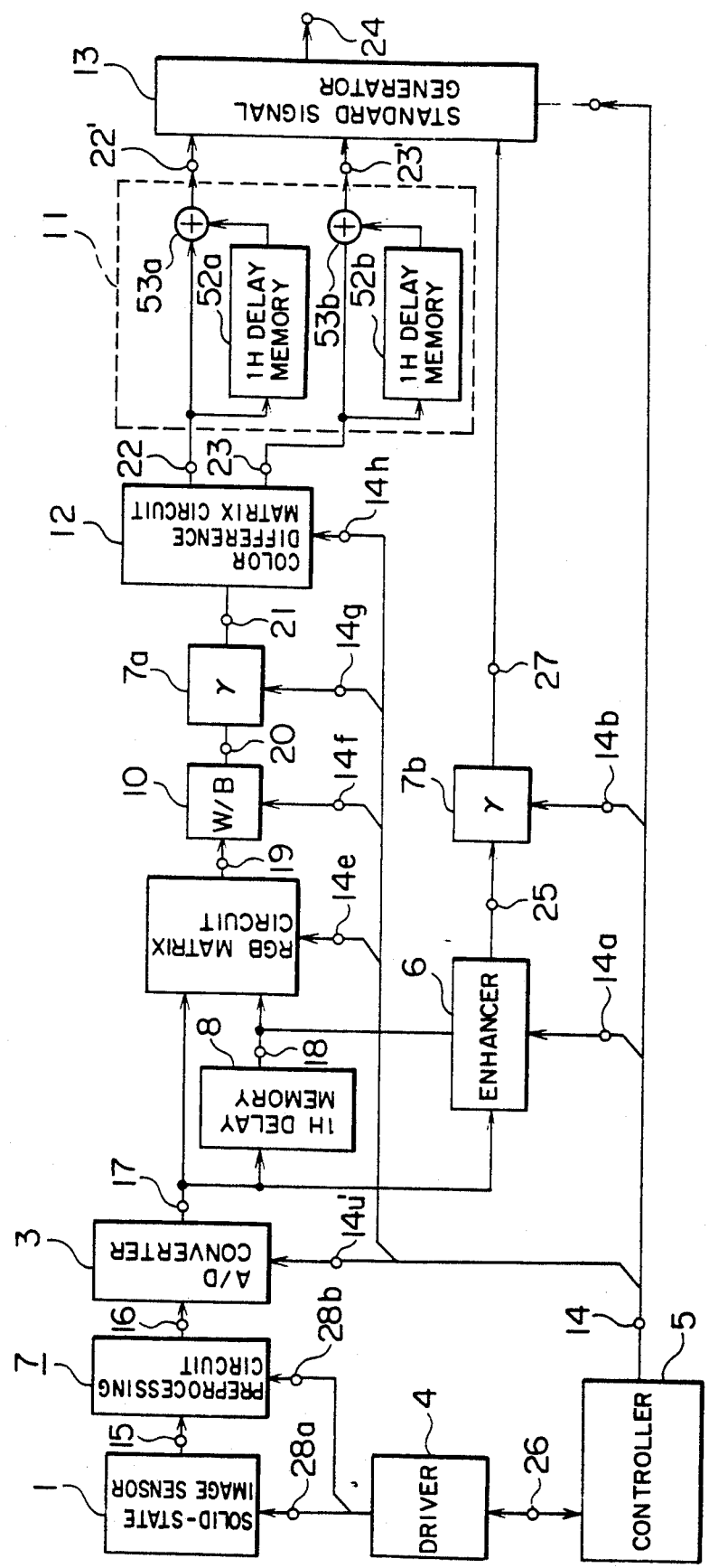
FIG. 14 is a schematic block diagram showing a second embodiment of a digital signal processor system in accordance with the present invention.

FIG. 14 is a block diagram showing a second embodiment of a digital signal processing system in accordance with the present invention. In this embodiment, the constituent elements developing the same functions as those of the associated components of the first embodiment are assigned with the same reference numerals and a redundant description thereof will be here avoided. A description will be given of components different from those of the first embodiment.

The configuration is different from the first embodiment in that 1H delay circuits 52a and 52b and adder circuits 53a and 53b are disposed between the color matrix circuit 12 and the standard signal generator circuit 13. The 1H delay circuits 52a and 52b respectively delay the color difference signals R-Y and B-Y from the color difference matrix circuit 12 to deliver the resultant signals to the adder circuits 53a and 53b, respectively. The adders 53a and 53b respectively add the delayed signals R-Y and B-Y from the 1H delay circuits 52a and 52b to the color signals R-Y and B-Y directly from the color difference matrix circuit 12. In short, a combination of the 1H delay circuit 52a and the adder 53a and a combination of the 1H delay circuit 52b and the adder 53b constitute comb line filters, respectively. The comb line filters reduce noises of the received signals based on a vertical correlation. The resultant color difference signals $\{(R-Y)^e\}'$ and $\{(B-Y)^e\}'$ to be fed to the standard signal generator 13 are represented in this connection as follows.

Expressing the color difference signals attained through the e-th and (e-1)th horizontal scannings as $(R-Y)^e$, $(R-Y)^{e-1}$ $(B-Y)^e$, $(B-Y)^{e-1}$ signals developed at terminals 22' and 23' becomes to be averaged values as follows.

$\{(R-Y)^l\}' = \frac{1}{2}(R-Y)^l + \frac{1}{2}(R-Y)^{l-1}$ $\{(B-Y)^l\}' = \frac{1}{2}(B-Y)^l + \frac{1}{2}(B-Y)^{l-1}$ In consequence, when compared with the first embodiment, this embodiment develops an improved signal-to-noise ratio. Furthermore, the provision above leads to an advantage when shooting an object having portions of different colors brought into contact with each other along an inclined line on a screen. Namely, an unnatural feeling of an image of zigzag boundaries between the color portions can be reduced. Although the vertical resolution of the color signals is slightly lowered, the magnitude of reduction is smaller as compared with the conventional case including the similar comb line filters. The other advantages of this embodiment are the same as those described in conjunction with the first embodiment.

Figure 15:
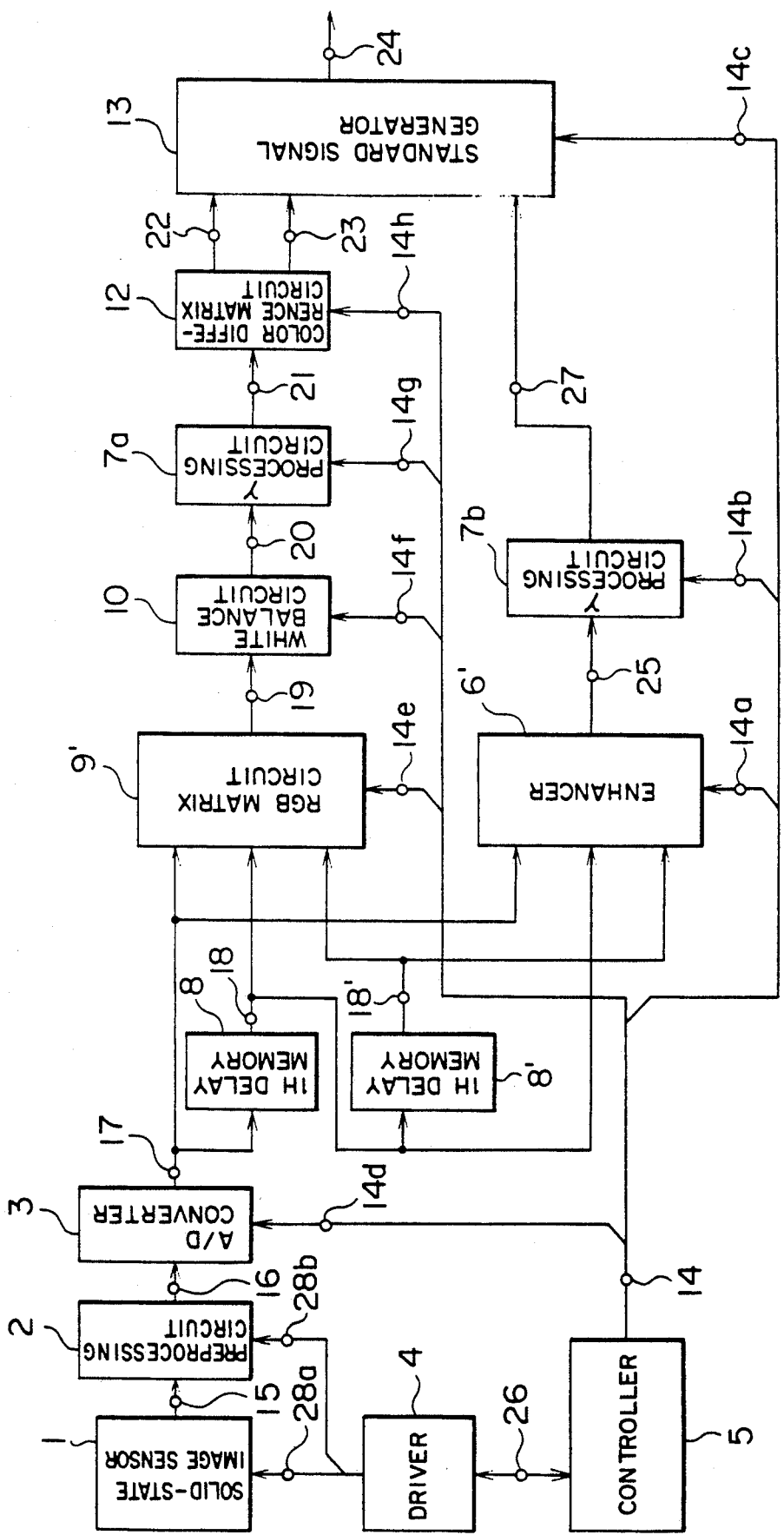
FIG. 15 is a block diagram illustratively showing a third embodiment of a digital signal processor system in accordance with the present invention.

FIG. 15 is a block diagram showing a third embodiment of a digital signal processing system in accordance with the present invention. When compared with the second embodiment, this embodiment includes a reduced number of 1H delay memories employed for the signal processing. Furthermore, the present embodiment is associated with the following features.

1) Pixel signals attained through horizontal scanning operations of three adjacent lines are processed to crate the red, green, and blue signals R, G, and B. At the same time, comb line filters are adopted to remove noises from these color signals R, G, and B. The signal-to-noise ratio is improved and the unnaturalness in the boundary between different color portions is reduced. These advantages are developed with a similar degree to that of the second embodiment.

2) A vertical enhancer for three lines is disposed. The constitution of FIG. 15 includes a 1H delay memory 8', an RGB matrix circuit 9', and an enhancer circuit 6'. The other portions are identical to those of the first embodiment and hence are designated with the same reference numeral. A redundant description thereof will be here avoided.

Figure 16:
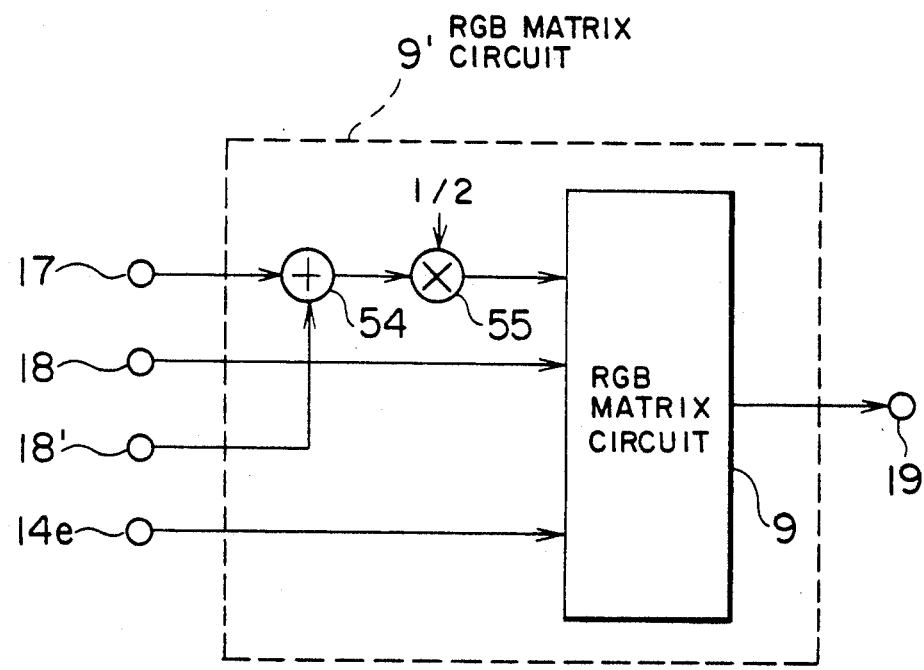
FIG. 16 is a diagram showing an alternative embodiment of a matrix circuit for red, blue, and green signals.
Figure 17:
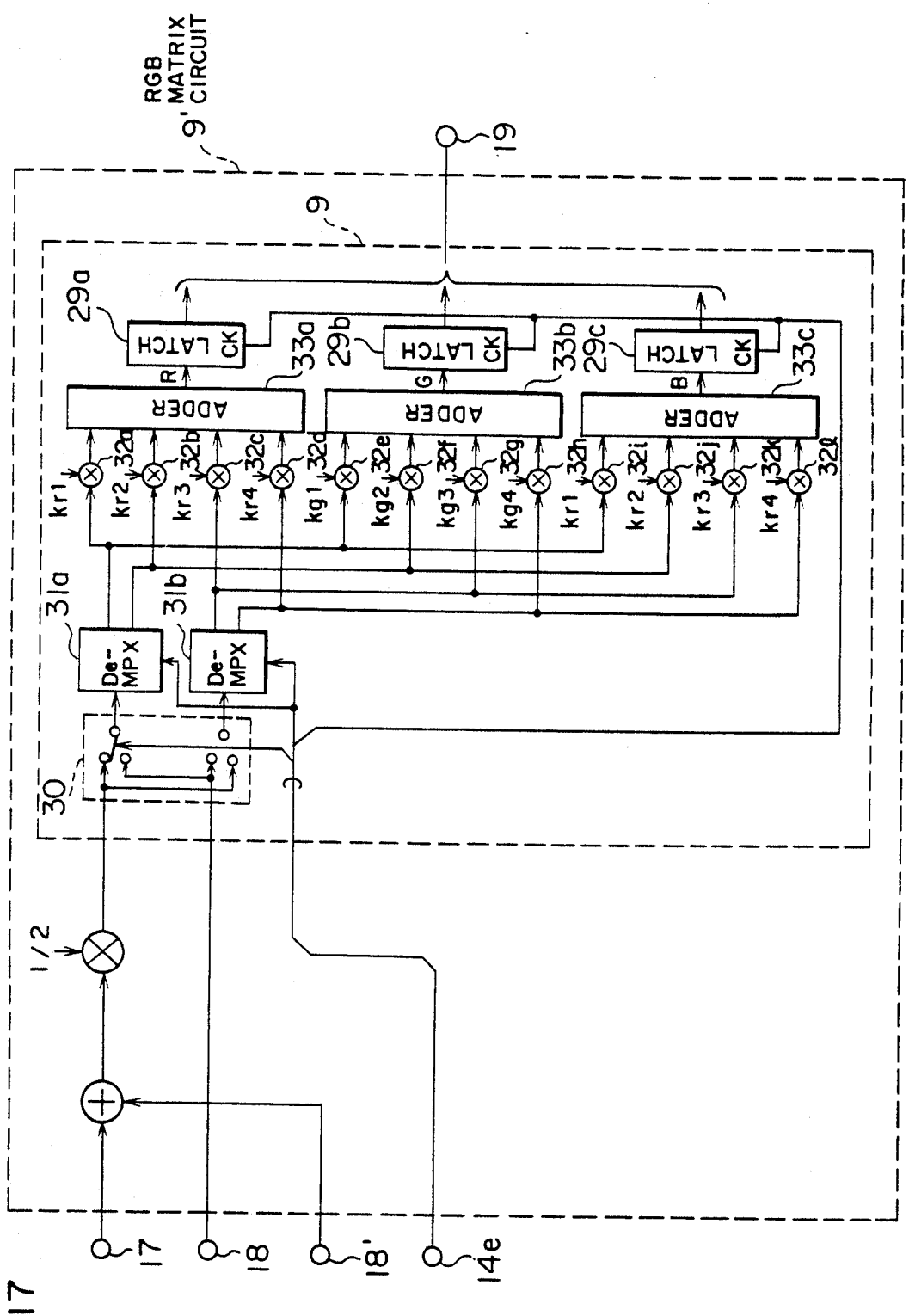
FIG. 17 is a diagram showing further an alternative embodiment of a matrix circuit for red, blue, and green signals.

This embodiment is different from the first and second embodiments as follows. The RGB matrix circuit 9' and the enhancer circuit 6' receive pixel signals associated with the horizontal scanning of three consecutive lines from the 1H delay memories 8 and 8' to produce therefrom signals R, G, and B and a luminance signal, respectively. Referring next to FIGS. 16 and 17, the operations of the RGB matrix circuit 9' and the enhancer circuit 6' will be described.

FIG. 16 is a block diagram showing an embodiment of the RGB matrix circuit 9', which includes an adder circuit 54, a coefficient multiplier circuit 55, and the RGB matrix circuit 9 of FIG. 1. Let us assume now that as a result of an e-th horizontal scanning, two pixel signals $A_i$ and $B_i$ are being supplied from the terminal 17. Because of the feature of the signals produced from the sensor above, pixel signals $C_i$ and $D_i$ attained through an (e-1)th horizontal scanning delayed by 1H with respect to the e-th horizontal scanning are fed to the terminal 18. Similarly, pixel signals Ai and Bi attained through an (e-2)th horizontal scanning delayed by 2H with respect to the e-th horizontal scanning are delivered to the terminal 18'. In the subsequent description, for discrimination between the pixel signals of the respective horizontal scannings, a pixel signal attained through the e-th horizontal scanning, for example, is represented as $A^e$. Signals $A^e$ and $B^e$ and $A^{e-2}$ and $B^{e-2}$ respectively received via the terminals 17 and 18' are fed to the adder circuit 54. The adder 54 adds the received signals in a manner to create pixel signals $(A^e+A^{e-2})$ and $(B^e+B^{e-2})$ to supply these signals to the coefficient multiplier circuit 55. This circuit 55 multiplies the received signals by ½ to deliver the resultant signals to the RGB matrix circuit 9. Receiving the dot-sequential signals $(A^e+A^{e-2})/2$ and $(B^e+B^{e-2})/2$ from the coefficient multiplier circuit 55 and dot-sequential signals $C^{e-1}$ and $D^{e-1}$ from the terminal 18, the RGB matrix circuit 9 separates therefrom respective color signals $(A^e+A^{e-2})/2$, $(B^e+B^{e-2})/2$, $C^{e-1}$, and $D^{e-1}$ to conduct a matrix processing thereon in a similar fashion as represented by the expression (9), thereby attaining color signals $R_T^e$, $G_T^e$, and $B_T^e$ associated with the horizontal scanning of three lines. These color signals $R_T^e$, $G_T^e$, and $B_T^e$ are represented as follows.

$$\begin{bmatrix} R_T^l \\ G_T^l \\ B_T^l \end{bmatrix} = A' \begin{bmatrix} (A^l + A^{l-2})/2 \\ (B^l + B^{l-2})/2 \\ C^{l-1} \\ D^{l-1} \end{bmatrix} \quad (16)$$

This expression can be reduced to $$\begin{bmatrix} R_T^l \\ G_T^l \\ B_T^l \end{bmatrix} = \tfrac{1}{2}A' \begin{bmatrix} A^l \\ B^l \\ C^{l-1} \\ D^{l-1} \end{bmatrix} + \tfrac{1}{2}A' \begin{bmatrix} A^{l-2} \\ B^{l-2} \\ C^{l-1} \\ D^{l-1} \end{bmatrix} \quad (17)$$

Where, the first and second terms of the right side of the expression (17) are identical to the expression (9). Namely, these terms are respectively $R^e$, $G^e$, and $B^e$ and $R^{e-1}$, $G^{e-1}$, and $B^{e-1}$ respectively attained through the e-th and (e-1)th horizontal scannings in the first embodiment. Using the expression (10), the expression (17) is reduced as follows.

$$\begin{bmatrix} R_T^l \\ G_T^l \\ B_T^l \end{bmatrix} = \tfrac{1}{2} \begin{bmatrix} R^l \\ G^l \\ B^l \end{bmatrix} + \tfrac{1}{2} \begin{bmatrix} R^{l-1} \\ G^{l-1} \\ B^{l-1} \end{bmatrix}$$

Namely, $R_T^e$, $G_T^e$, and $B_T^e$ produced from the RBG matrix circuit 9' can be obtained by processing $R^e$, $G^e$, and $B^e$ of the first embodiment by using the comb line filters. In contrast to the second embodiment in which the comb line filters are employed to process the color difference signals, the present embodiment uses the comb line filters to process the color signals.

Also in this embodiment, like in the second embodiment, the signal-to-noise ratios of the color signals are improved and the unnaturalness along boundaries of different color portions is reduced.

FIG. 17 shows an example of the RBG matrix circuit 9 in which the circuit shown in FIG. 4 is employed.

Figure 18:
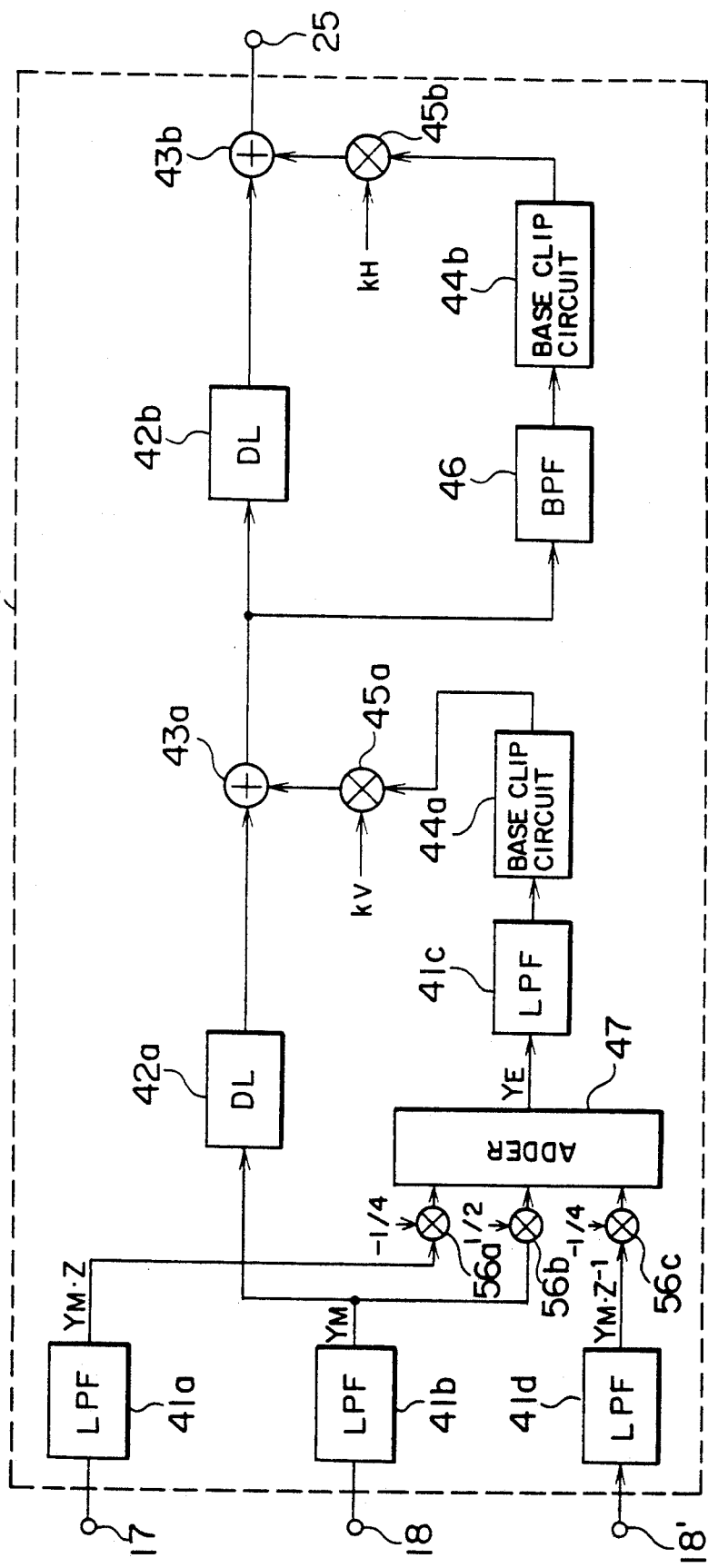
FIG. 18 is a diagram illustratively showing an alternative embodiment of an enhancer circuit.

FIG. 18 is a block diagram showing an example of the enhancer circuit 6' of FIG. 15. This system comprises low-pass filters (LPFs) 41a, 41b, 41c, and 41d and coefficient multiplier circuits 56a, 56b, and 56c. In this connection, the same constituent components as those of the example of FIG. 9 are assigned with the same reference numerals. A redundant description thereof will be avoided. First, the LPF 41a receives from terminal 17 a dot-sequential signal undergone and A/D conversion from the A/D converter circuit 3. The LPF 41b is supplied via the terminal 18 with a dot-sequential signal delayed by 1H from the 1H delay memory 8. The LPF 41d is supplied via the terminal 18' with a dot-sequential signal delayed by 2H by means of the 1H delay memories 8 and 8'. Like in the embodiment shown in FIG. 9, a signal component having frequencies in the neighborhood of a repetition frequency of two pixel signals is removed from the received signal in each of the LPFs 41a, 41b, and 41d, thereby producing respective luminance signals from the associated dot-sequential signals. On receiving these signals from the LPFs 41a, 41b, and 41d, the respective coefficient multiplier circuits 56a, 56b, and 56d respectively multiply the signals by $-\frac{1}{4}$, $\frac{1}{2}$, and $-\frac{1}{4}$ to send the resultant signals to the adder 47. The adder 47 adds the received signals to each other to deliver an obtained signal to the base clip circuit 44a. In this regard, assuming that the LPF 41b produces an output signal $Y_M$, the LPFs 41a and 41d create output signals $Y_m \cdot Z$ and $Z^{-1}$, respectively. Furthermore, assuming the adder circuit 47 generates an output signal $Y_F$, $$Y_E = -\tfrac{1}{4}Y_M \cdot Z^{-1} + \tfrac{1}{2}Y_M - \tfrac{1}{4}Y_M \cdot Z^1$$

The transfer function here is represented as follows.

$$Y_E/Y_M = -\tfrac{1}{4}Z^{-1} + \tfrac{1}{2}Z^0 + (-\tfrac{1}{4})Z^1$$

Figure 19A:
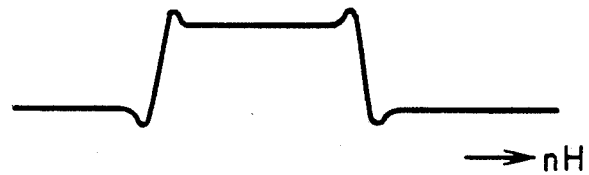
FIGS. 19A and 19B are graphs respectively showing luminance signals after enhancement.
Figure 19B:

This indicates that the system includes a symmetric finite-duration impulse-response (FIR) filter of degree of three and a band-pass filter (BPF) having a flat group delay characteristic. The signal $Y_E$ obtained from the BPF above is passed through the LPF 41c and the base clip circuit 44a, which remove noises therefrom and then send a resultant signal top the coefficient multiplier circuit 45a. This circuit 45a adjusts a gain of the received signal to pass an obtained signal to the adder circuit 43a. The adder 43a adds the luminance Signal $Y_M$ appropriately delayed by the delay circuit 42a to the vertical enhancer signals from the coefficient multiplier circuit 45a to obtain a luminance signal undergone an enhancement in the vertical direction. The vertical enhancer section is so-called a three-line enhancer developing a quite satisfactory transition response characteristic when compared with the enhancer circuit already described. FIGS. 19A and 19B respectively show, for comparison, transition response waveforms at a vertical edge developed in the present enhancer circuit and the enhancer circuit of the previous embodiment, respectively. As can be seen from FIG. 19A, the enhancer circuit produces a waveform having a balanced shape between undershoot and overshoot portions. Namely, the vertical edge of the signal waveform has been emphasized with an appropriate transition response. Furthermore, the enhancer circuit 6' and the RGB matrix circuit 9' for the color separation share two 1H delay memories 8 and 8', the number of 1H delay memories is reduced to develop the following features.

1) The signal-to-noise ratio of the color signal is improved and the unnaturalness of boundaries between different color portions is reduced.

2) A three-line enhancer circuit is implemented.

The other advantageous features are the same as those of the first embodiment.

Figure 20:
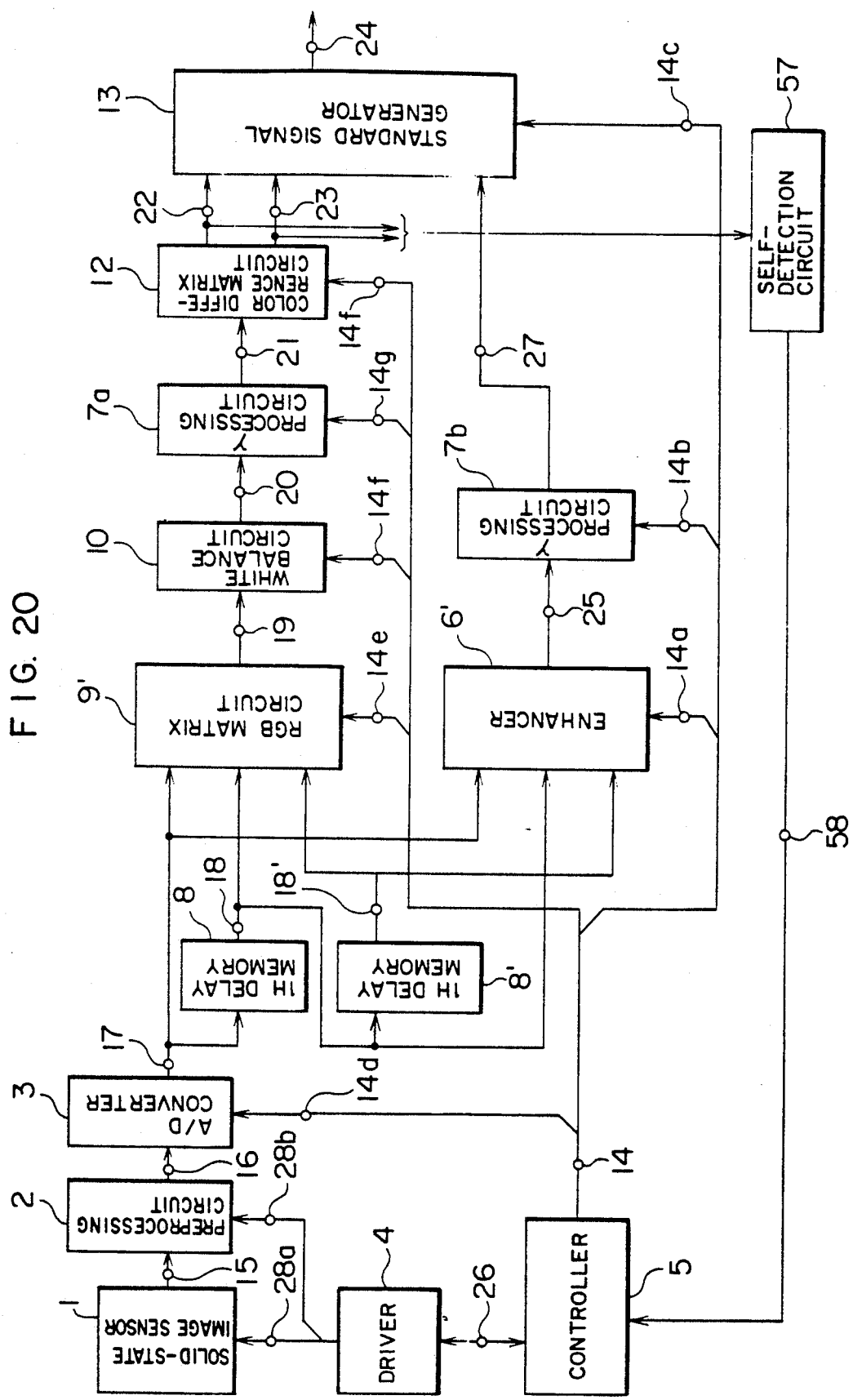
FIG. 20 is a block diagram illustratively showing a fourth embodiment of a digital signal processor system in accordance with the present invention.

FIG. 20 is a block diagram of a digital signal processor system as a fourth embodiment in accordance with the present invention. This configuration includes a white sensor circuit 57n and a terminal 58 for supplying the control circuit 5 with a sense value from the white sensor circuit 57. The constituent elements functioning in the same way as for those of the preceding embodiments are assigned with the same reference numeral. A redundant description thereof will be here avoided. The present embodiment is implemented by adding an automatic white balance adjuster circuit to the constitution of the third embodiment. The adjuster circuit will now be described.

Figure 21:
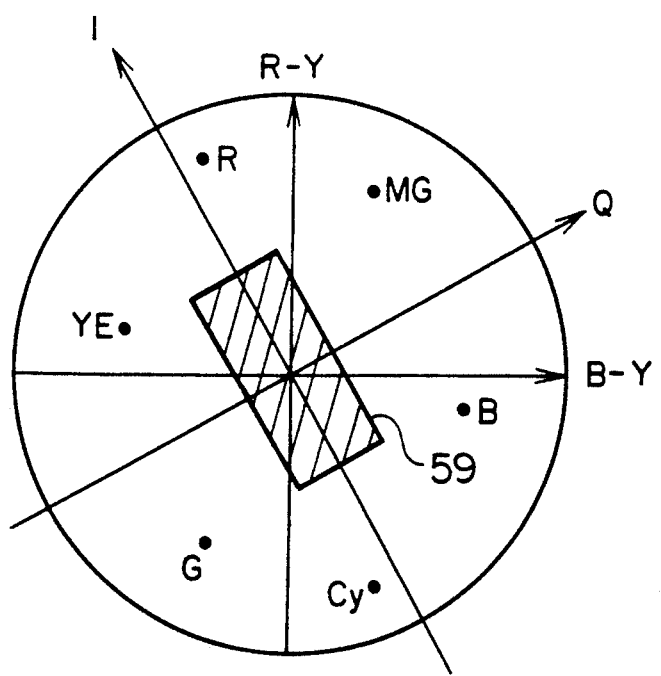
FIG. 21 is a diagram schematically showing a region in which a self-detection is conducted.

FIG. 21 shows a region in which a white sense operation is conducted. In this graph, dots denote locations where respective pure colors are found. The other locations are associated with intermediate colors of the respective colors.

First, on receiving the two color difference signals R-Y and B-Y from the color difference matrix circuit 12, the white sensor circuit 57 accomplishes a matrix operation thereon to obtain two color difference signals I and Q. FIG. 21 includes an I signal axis along which white moves when a color temperature changes and a Q signal axis orthogonal to the I signal axis. Assuming now a conversion matrix with respect to the signals above to be H, the following relationship is attained.

$$\begin{bmatrix} I \\ Q \end{bmatrix} = H \begin{bmatrix} R-Y \\ B-Y \end{bmatrix} \left( \text{e.g. } H = \begin{bmatrix} 1 & -1 \\ 1 & 1 \end{bmatrix} \right)$$

The white sensor circuit 57 senses a region 59 shadowed in FIG. 21 by use of the signals I and Q to determine the zone 59. This circuit 57 then integrated the signal I with respect to the area 59 to generate a sense signal indicating a position of white on the I axis. (The sense signal is assumed to be represented as $\int IDT$.) The attained sense signal $\int IDT$ is further fed via the terminal 58 to the control circuit 5. On receiving the signal, the control circuit 5 having an up-down counter therein decrements or increments the content of the counter when the value of $\int IDT$ is positive or negative, respectively. Assuming here the resultant counter value to be $I_{Det}$, a coordinate axis transformation is achieved as follows to create control voltages $K_R$ and $K_B$.

$$\begin{bmatrix} K_R \\ K_B \end{bmatrix} = H' \begin{bmatrix} I_{Det} \\ O \end{bmatrix} \left( \text{e.g. } H' = \begin{bmatrix} 1 & 1 \\ -1 & 1 \end{bmatrix} \right)$$

These voltages are then fed to the white balance circuit 10. Depending On the voltages $K_R$ and $K_B$, the white balance circuit 10 controls the gains of the signals R and B. Incidentally, the white balance circuit 10, the γ processing circuit 7a, the color difference matrix circuit 12, the white sensor circuit 57, and the control circuit 5 constitute a control loop, which achieves a control operation to attain $\int Rdt = 0$. Namely, when this condition holds, the white balance is satisfactorily established and hence the following conditions are satisfied in a portion having no color.

$$R-Y \approx O \text{ and } B-Y \approx O$$

In the present embodiment, in addition to the advantage of the third embodiment, an automatic adjustment of the white balance can be accomplished.

Figure 22:
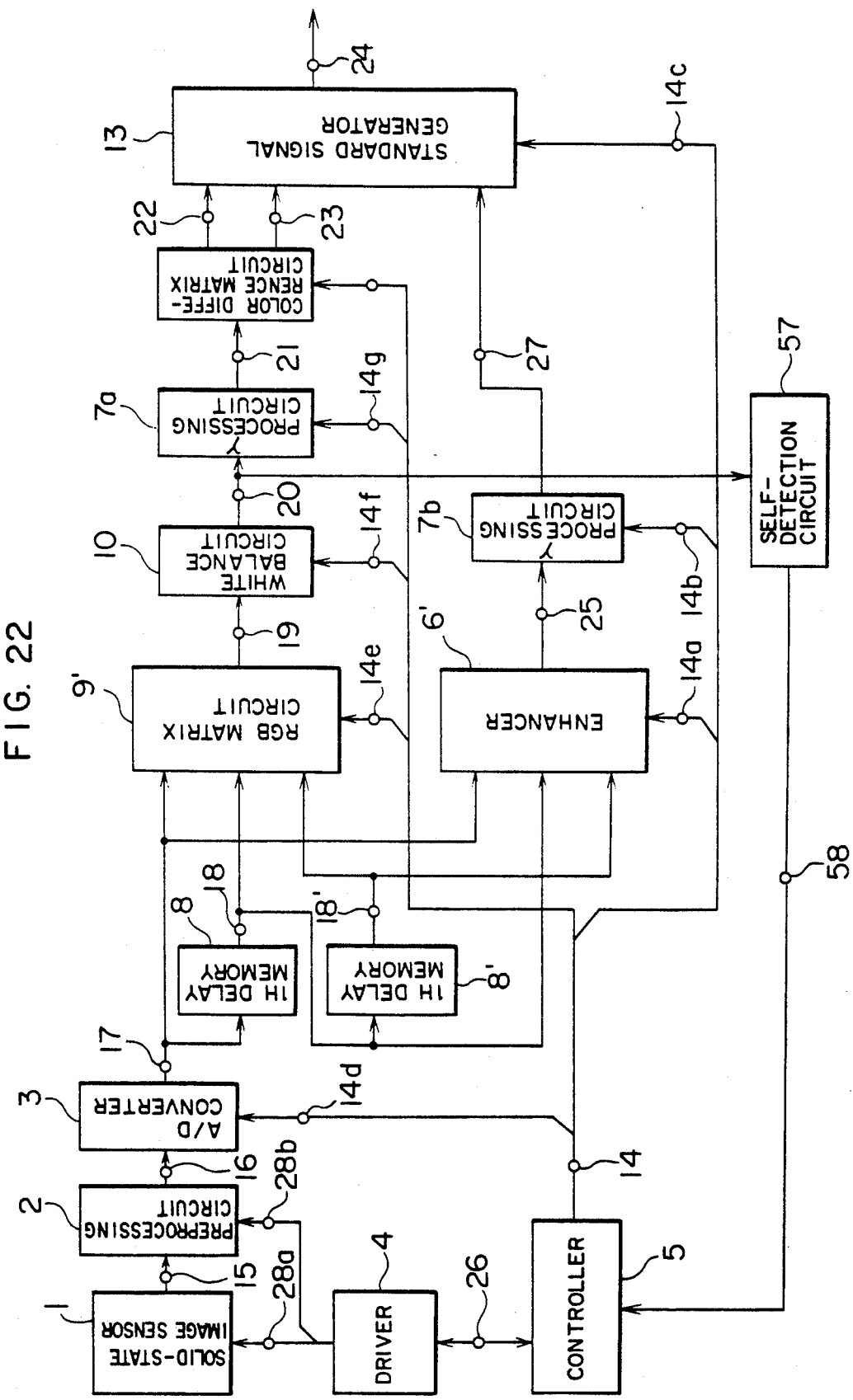
FIG. 22 is a block diagram illustratively showing a fifth embodiment of a digital signal processor system in accordance with the present invention.

FIG. 22 is a block diagram showing a fifth embodiment of a digital signal processing system in accordance with the present invention. Like the fourth embodiment, the fifth embodiment includes an automatic white balance adjuster circuit. When compared with the fourth embodiment in which the color difference signals R-Y and B-Y are used to sense white, this embodiment employs the red, green, and blue signals R, G, and B for the white sense operation. Also in this embodiment the white balance adjustment can be automatically achieved in the same fashion as for the fourth embodiment.

While particular embodiments of the invention have been shown and described, it will be obvious to those skilled in the art that various changes and modifications may be made without departing from the present invention in its broader aspects.

We claim:

1. A digital signal processing apparatus for use in an imaging system comprising:

image means including means for producing, in a horizontal scanning period, a first dot-sequential signal constituted with repetitions of two kinds of pixel signals respectively associated with a first color and a second color, means for generating, in a subsequent horizontal scanning period, a second dot-sequential signal constituted with repetitions of two kinds of pixel signals respectively associated with a third color and a fourth color, and means for alternately outputting the first and second dot-sequential signals for each horizontal scanning period;

analog-to-digital (A/D) convert means for digitalizing for each pixel signal the first and second dot-sequential signals delivered from said image means and for producing a first digital dot-sequential signal and a second digital dot-sequential signal;

first delay means for delaying by a horizontal scanning period (1H) the first and second digital dot-sequential signals created from said A/D convert means;

means for separating four kinds of digital pixel signals respectively associated with the first, second, third, and fourth colors from the first (or second) dot-sequential signal generated from said A/d convert means and the second (or first) dot-sequential signal delayed by 1H from said first 1H delay means;

first compute means for achieving a matrix processing on the four kinds of digital pixel signals to produce digital R, G and B signals;

luminance signal generate means for creating a digital luminance signal from the first and second digital dot-sequential signals sent from said A/D convert means and the first and second digital dot-sequential signals delayed by 1H and supplied from said first 1H delay means;

first γ process means for conducting a γ processing on the digital R, G and B signals from said first compute means;

second γ process means for conducting a γ processing on the digital luminance signal outputted from said luminance signal generate means; and second computer means for processing said digital R, G and B signals outputted from said first γ process means with the following matrix process in order to obtain color difference signals (R-Y) and (B-Y)

$$\begin{pmatrix} R - Y \\ B - Y \end{pmatrix} = \begin{pmatrix} 1 - r & -g & -b \\ r & -g & 1 - b \end{pmatrix} \begin{pmatrix} R \\ G \\ B \end{pmatrix}$$

where R, G and B are respectively a visibility for red, green and blue, and an equation $r + g + b = 1$ is satisfied.

2. A digital signal processing apparatus according to claim 1 wherein said first compute means includes matrix process means for computing a matrix operation by assuming the digital color signals of red, green, and blue to be R, G, and B; the digital pixel signal associated with the first color to be Mg + Ye, the digital pixel signal associated with the second color to be G + Cy, the digital pixel signal associated with the third color to be MG + Cy, the digital pixel signal associated with the fourth color to be G + Ye, said matrix operation being represented as $$\begin{bmatrix} R \\ G \\ B \end{bmatrix} = Q' \begin{bmatrix} Mg + Ye \\ G + Cy \\ Mg + Cy \\ G + Ye \end{bmatrix}$$

where, Q' is a matrix satisfying $QQ' = I$ (I is a unitary matrix) and Q holds a relationship of $$\begin{bmatrix} Mg + Ye \\ G + Cy \\ Mg + Cy \\ G + Ye \end{bmatrix} = Q \begin{bmatrix} R \\ G \\ B \end{bmatrix}$$

thereby attaining the digital color signals R, B, and G.

3. A digital signal processing apparatus according to claim 1 wherein said luminance signal generate means includes:

means for applying a band limitation on the digital dot-sequential signal from said A/D convert means and the first and second digital dot-sequential signals from said first 1H delay means;

means for obtaining differences between the signals thus undergone the band limitation;

first add means for adding the differences to a signal developed by delaying by a predetermined delay period an output from said band limit means;

means for extracting a particular frequency from an output from said add means, said digital signal processing apparatus further comprising a second add means for adding the extracted signal to the signal developed by delaying by a predetermined delay period an output from said band limit means.

4. A digital signal processing apparatus according to claim 1 further including comb line filter means for processing the first and second digital color difference signals generated from said second compute means.

5. A digital signal processing apparatus according to claim 4 wherein said comb line filter means comprises a 1H delay means an add means.

6. A digital signal processing apparatus for use in an imaging system comprising:

image means including means for producing, in a horizontal scanning period, a first dot-sequential signal constituted with repetitions of two kinds of pixel signals respectively associated with a first color and a second color, means for generating, in a subsequent horizontal scanning period, a second dot-sequential signal constituted with repetitions of two kinds of pixel signals respectively associated with a third color and a fourth color, and means for alternately outputting the first and second dot-sequential signals for each horizontal scanning;

analog-to-digital (A/D) convert means for digitalizing for each pixel signal the first and second dot-sequential signals delivered from said image means and for producing a first digital dot-sequential signal and a second digital dot-sequential signal;

first delay means for delaying by a horizontal scanning period (1H) the first and second digital dot-sequential signals created from said A/D convert means;

second delay means for further delaying by a horizontal scanning period (1H) the first and second digital dot-sequential signals thus delayed by 1H in said first delay means;

means for separating four kinds of digital pixel signals respectively associated with the first, second, third and fourth colors from the first (or second) digital dot-sequential signal generated from said A/D convert means, the second (or first) digital dot-sequential signal delayed by 1H from said first 1H delay means, and the first (or second) digital dot-sequential signal totally delayed by 2H from said second 1H delay means;

first compute means for achieving a matrix processing on the four kinds of separated digital pixel signals to produce digital color signals;

luminance signal generate means for creating a digital luminance signal from the first and second digital dot-sequential signals sent from said A/D convert means, the first and second digital dot-sequential signals delay by 1H and supplied from said first 1H delay means, and the first and second digital dot-sequential signals totally delayed by 2H and supplied from said second 1H delay means;

first $\gamma$ process means for conducting a $\gamma$ processing on the digital color signals from said first compute means;

second $\gamma$ process means for conducting a $\gamma$ processing on a digital luminance signal outputted from said luminance signal generate means; and second compute means for computing differences between two digital color signals selected from the digital color signals processed by said first $\gamma$ process means, thereby producing a first digital color difference signal and a second digital color difference signal.

7. A digital signal processing apparatus according to claim 6 wherein said first compute means includes matrix process means for computing a matrix operation by assuming the digital color signals of red, green, and blue to be R, G, and B; the digital pixel signals respectively associated with the first, second, third, and fourth colors to be respectively designated as $A = Mg + Ye$, $B = G + Cy$, $C = Mg + Cy$, and $D = G + Ye$; the digital pixel signals and the color signals attained through an e-th horizontal scanning to be respectively indicated as $A^e$, $B^e$, $C^e$, $D^e$, $R^e$, $G^3$, and $B^e$; the digital pixel signals and the color signals attained through an (e-1)th horizontal scanning to be respectively denoted as $A^{e-1}$, $B^{e-1}$, $C^{e-1}$, $D^{e-1}$, $R^{e-1}$, $G^{e-1}$, and $B^{e-1}$; and the digital pixel signals and the color signals attained through an (e-2)th horizontal scanning to be respectively denoted as $A^{e-2}$, $B^{e-2}$, $C^{e-2}$, $D^{e-2}$, $R^{e-2}$, $G^{e-2}$, and $B^{e-2}$, said matrix operation being represented as $$\begin{bmatrix} R_T^l \\ G_T^l \\ B_T^l \end{bmatrix} = \tfrac{1}{2} Q' \begin{bmatrix} A^l \\ B^l \\ C^{l-1} \\ D^{l-1} \end{bmatrix} + \tfrac{1}{2} Q' \begin{bmatrix} A^{l-2} \\ B^{l-2} \\ C^{l-1} \\ D^{l-1} \end{bmatrix}$$

$$= \tfrac{1}{2} \begin{bmatrix} R^l \\ G^l \\ B^l \end{bmatrix} + \tfrac{1}{2} \begin{bmatrix} R^{l-1} \\ G^{l-1} \\ B^{l-1} \end{bmatrix}$$

where, $$\begin{bmatrix} R^l \\ G^l \\ B^l \end{bmatrix} = Q' \begin{bmatrix} A^l \\ B^l \\ C^{l-1} \\ D^{l-1} \end{bmatrix} \quad \begin{bmatrix} R^{l-1} \\ G^{l-1} \\ B^{l-1} \end{bmatrix} = Q' \begin{bmatrix} A^{l-1} \\ B^{l-2} \\ C^{l-1} \\ D^{l-1} \end{bmatrix}$$

where, Q' is a matrix satisfying QQ'=I (I is a unitary matrix) and Q holds a relationship of $$\begin{bmatrix} A \\ B \\ C \\ D \end{bmatrix} = Q \begin{bmatrix} R \\ G \\ B \end{bmatrix}$$

thereby attaining as an output from said first compute means the digital color signals R, B, and G.

* * * * *